United States Patent
Jaber et al.

(10) Patent No.: US 12,320,536 B2
(45) Date of Patent: *Jun. 3, 2025

(54) CAPACITY CONTROL FOR HVAC SYSTEM

(71) Applicant: Trane International Inc., Davidson, NC (US)

(72) Inventors: Youssef A. Jaber, Tyler, TX (US); Wayne N. Kraft, Tyler, TX (US); Ragunanthanan Mylsamy, Chennai (IN); Satish Mukundan Thiruvengadam, Chennai (IN); Satheesh Dharmar, Chennai (IN); Arulkumar Kaliyaperumal, Mayiladuthurai (IN); Shivakumar Kolloju, Chennai (IN); Sunit Agrawal, Chennai (IN)

(73) Assignee: Trane International Inc., Davidson, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/544,722

(22) Filed: Dec. 19, 2023

(65) Prior Publication Data

US 2024/0133575 A1    Apr. 25, 2024

Related U.S. Application Data

(63) Continuation of application No. 17/453,984, filed on Nov. 8, 2021, now Pat. No. 11,892,188.

(30) Foreign Application Priority Data

May 30, 2021  (IN) .............................. 202131024083

(51) Int. Cl.
*F24F 11/67* (2018.01)
*F24F 11/41* (2018.01)
(Continued)

(52) U.S. Cl.
CPC .............. *F24F 11/67* (2018.01); *F24F 11/41* (2018.01); *F24F 11/74* (2018.01); *F24F 2110/10* (2018.01); *F24F 2110/20* (2018.01)

(58) Field of Classification Search
CPC .. F24F 11/67; F24F 11/41; F24F 11/74; F24F 2110/10; F24F 2110/20; F24F 11/50;
(Continued)

(56) References Cited

U.S. PATENT DOCUMENTS 5,386,705 A * 2/1995 Jones .................... F25B 17/083
                                                62/480
7,017,827 B2   3/2006 Shah et al.
(Continued)

*Primary Examiner* — Alicia M. Choi
(74) *Attorney, Agent, or Firm* — WOMBLE BOND DICKINSON (US) LLP

(57) ABSTRACT

A method is provided for controlling an HVAC system. The method includes receiving zone priority levels and zone temperature setpoints, where at least one of the zones haves a higher priority level than others of the zones, receiving an indication of zone ambient temperature values, determining requested zone capacity values to maintain the zone ambient temperature values within a threshold deviation of respective ones of the zone temperature setpoints, determining target zone capacity values from the requested zone capacity values and zone size values, and from the zone priority levels where the target zone capacity values may be responsive to a total of the requested zone capacity values that is less than a minimum capacity or greater than a maximum capacity of the HVAC system, and causing the HVAC system to provide the conditioned air to the zones according to respective ones of the target zone capacity values.

20 Claims, 8 Drawing Sheets

(51) Int. Cl.
*F24F 11/74* (2018.01)
*F24F 110/10* (2018.01)
*F24F 110/20* (2018.01)

(58) Field of Classification Search
CPC ........ F24F 11/61; F24F 2120/10; F24F 11/30; F24F 11/46; G05D 23/1934; G05B 15/02
See application file for complete search history.

(56) References Cited

U.S. PATENT DOCUMENTS

| | | | |
|---|---|---|---|
| 7,036,743 B2 | 5/2006 | Shah | |
| 7,377,450 B2 | 5/2008 | Van Ostrand et al. | |
| 7,455,237 B2* | 11/2008 | Kates | F24F 11/58 |
| | | | 165/208 |
| 9,134,038 B2 | 9/2015 | Lee et al. | |
| 9,429,923 B2 | 8/2016 | Ward et al. | |
| 9,625,171 B2 | 4/2017 | Macek et al. | |
| 9,803,883 B2 | 10/2017 | Fan et al. | |
| 9,851,727 B2 | 12/2017 | Simon et al. | |
| 10,371,405 B2 | 8/2019 | Albonesi et al. | |
| 10,437,207 B2 | 10/2019 | Wacker | |
| 10,845,083 B2 | 11/2020 | Turney | |
| 2005/0146309 A1* | 7/2005 | Chen | H02P 9/305 |
| | | | 322/28 |
| 2007/0012052 A1* | 1/2007 | Butler | F24F 11/65 |
| | | | 62/181 |
| 2010/0082162 A1* | 4/2010 | Mundy | F24F 11/86 |
| | | | 700/277 |
| 2012/0052791 A1 | 3/2012 | Kurelowech | |
| 2013/0118188 A1 | 5/2013 | McKie et al. | |
| 2014/0338381 A1 | 11/2014 | Nomoto et al. | |
| 2015/0021005 A1* | 1/2015 | Land, III | F24F 11/86 |
| | | | 165/223 |
| 2015/0316276 A1 | 11/2015 | Matsugi | |
| 2016/0252266 A1 | 9/2016 | Ushirosako et al. | |
| 2017/0205096 A1 | 7/2017 | Wacker | |
| 2017/0217104 A1* | 8/2017 | Cortes I Herms | B33Y 30/00 |
| 2017/0356666 A1 | 12/2017 | Adkerson | |
| 2018/0017275 A1* | 1/2018 | Merrill | F24F 11/62 |
| 2018/0372345 A1* | 12/2018 | Fischer | F24F 5/0089 |
| 2019/0195527 A1 | 6/2019 | Puranen et al. | |
| 2019/0195528 A1 | 6/2019 | Puranen et al. | |
| 2019/0236446 A1 | 8/2019 | Qin | |
| 2019/0257544 A1 | 8/2019 | Alanqar et al. | |
| 2019/0264940 A1* | 8/2019 | Lee | F24F 11/58 |
| 2019/0354071 A1 | 11/2019 | Turney et al. | |
| 2019/0383512 A1 | 12/2019 | McCune et al. | |
| 2020/0340704 A1 | 10/2020 | Ross | |
| 2020/0355415 A1 | 11/2020 | Yanachi et al. | |
| 2022/0196279 A1 | 6/2022 | Son et al. | |
| 2022/0390138 A1* | 12/2022 | Jaber | F24F 11/50 |

* cited by examiner

266 — RECEIVE AN INDICATION OF THE ZONE SIZE VALUES EXPRESSED AS MAXIMUM ZONE AIRFLOW VALUES FOR THE ZONES WITH RESPECTIVE ONES OF THE ZONE DAMPERS IN A FULLY-OPEN POSITION

FIG. 2J

268 — PROVIDE LESS OF THE CONDITIONED AIR TO THE AT LEAST ONE OF THE ZONES HAVING THE HIGHER PRIORITY

270 — ACTUATE THE ZONE DAMPERS TO REGULATE AIRFLOW OF THE CONDITIONED AIR TO RESPECTIVE ONES OF THE ZONES

272 — ACTUATE THE ZONE DAMPERS TO PROVIDE LESS OF THE CONDITIONED AIR TO THE AT LEAST ONE OF THE ZONES HAVING THE HIGHER PRIORITY DURING THE DEFROST CYCLE

FIG. 2K

CAPACITY CONTROL FOR HVAC SYSTEM

CROSS-REFERENCE TO RELATED APPLICATIONS

This application is a continuation of U.S. patent application Ser. No. 17/453,984, entitled "CAPACITY CONTROL FOR HVAC SYSTEM" filed Nov. 8, 2021, which claims the benefit of IN Provisional Application No. 202131024083 filed May 30, 2021, each of which is hereby incorporated by reference in its entirety.

TECHNOLOGICAL FIELD

The present disclosure relates generally to the control of heating, ventilation, and/or air conditioning (HVAC) systems, and in particular, systems and methods for controlling the distribution of the capacity of an HVAC system providing conditioned air to a conditioned space.

BACKGROUND

Climate control systems, such as heating, ventilation, and/or air conditioning (HVAC) systems are used in residential and/or commercial areas to heat, cool or otherwise condition interior spaces. An HVAC system generally includes HVAC equipment with a fan with a heating and/or cooling element configured to provide conditioned air to a conditioned space. In general, a problem exists for an HVAC system providing conditioning to a plurality of zones, as existing HVAC systems are not able to provide uniform comfort across the full capacity range.

In current systems, the sensible capacity demand for a given conditioned zone is typically derived from the temperature setpoint for the zone and the measured temperature, and different HVAC systems have different methods for satisfying this demand. For a non-zoned system, the HVAC system usually satisfies the requested load by providing the requested capacity. In these systems, the requested demand can be lower than the minimum capacity of the system, and in these instances, the HVAC system may cycle on and off to meet the demand on average. If the requested demand is higher than the maximum capacity of a non-zoned system, the equipment delivers the maximum capacity to satisfy the load to the greatest extent possible.

In zoned systems, however, more complex scenarios arise. In these systems, the zones may have physical constraints, e.g., some zones have maximum capacities potentially based on duct sizes or other zone specific constraints. As a result, the minimum capacity of the overall system may be higher than the zone sizes of one or more zones. In these instances, if the system provides relief, the capacity provided results in excess capacity, which may be detrimental to the comfort of one or more of the zones.

In other instances, two or more zones may request a capacity that is higher than the maximum capacity of the HVAC system. In these instances, the system must distribute the limited capacity in some manner. In addition, other actions, including negative actions, such as defrost, may impact the overall capacity of the system, again resulting in an imbalance of the capacity the system can deliver and the capacity the zones are requesting.

Accordingly, a need exists for a controller that is able to address these problems and improve the overall capacity distribution of a system, particularly for zoned applications.

BRIEF SUMMARY

Example implementations of the present disclosure provide an HVAC system and associated methods for improved capacity control of the HVAC system. These capacity control systems and methods, in some examples, determine how to allocate the capacity between the zones calling for conditioned air. In some instances, these systems further distribute this capacity to non-calling zones. These systems receive various information associated with the zones, and use this information to determine requested capacity values for each zone. These requested capacity values, in some examples, are used to create target capacity values for respective ones of the zones, and in some instances, these target capacity values are determined as a result of the total requested capacity compared to the minimum and maximum capacity of the system. The target capacity values may be scaled down in response to the total requested capacity being greater than the maximum capacity of the HVAC system, or scaled up in response to the total requested capacity being less than the minimum capacity of the HVAC system. And in some examples, the HVAC system provides conditioned air based on the targeted capacity values.

The present disclosure thus includes, without limitation, the following example implementations.

Some example implementations provide a heating, ventilation, and air conditioning (HVAC) system comprising HVAC equipment configured to provide conditioned air to a conditioned space that is divided into zones; and control circuitry operably coupled to the HVAC equipment and configured to at least: receive zone priority levels and zone temperature setpoints, at least one of the zones having a higher priority level than others of the zones; receive an indication of zone ambient temperature values; determine requested zone capacity values to maintain the zone ambient temperature values within a threshold deviation of respective ones of the zone temperature setpoints; determine target zone capacity values from the requested zone capacity values and zone size values, and from the zone priority levels responsive to a total of the requested zone capacity values that is less than a minimum capacity or greater than a maximum capacity of the HVAC system; and cause the HVAC system to provide the conditioned air to the zones according to respective ones of the target zone capacity values.

Some example implementations provide a method of controlling an HVAC system that includes HVAC equipment configured to provide conditioned air to a conditioned space that is divided into zones, the method comprising receiving zone priority levels and zone temperature setpoints, at least one of the zones having a higher priority level than others of the zones; receiving an indication of zone ambient temperature values; determining requested zone capacity values to maintain the zone ambient temperature values within a threshold deviation of respective ones of the zone temperature setpoints; determining target zone capacity values from the requested zone capacity values and zone size values, and from the zone priority levels responsive to a total of the requested zone capacity values that is less than a minimum capacity or greater than a maximum capacity of the HVAC system; and causing the HVAC system to provide the conditioned air to the zones according to respective ones of the target zone capacity values.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

FIGS. 2A, 2B, 2C, 2D, 2E, 2F, 2G, 2H, 2I, 2J and 2K are flowcharts illustrating various operations in a method of controlling an HVAC system, according to some example implementations.

DETAILED DESCRIPTION

Figure 1:
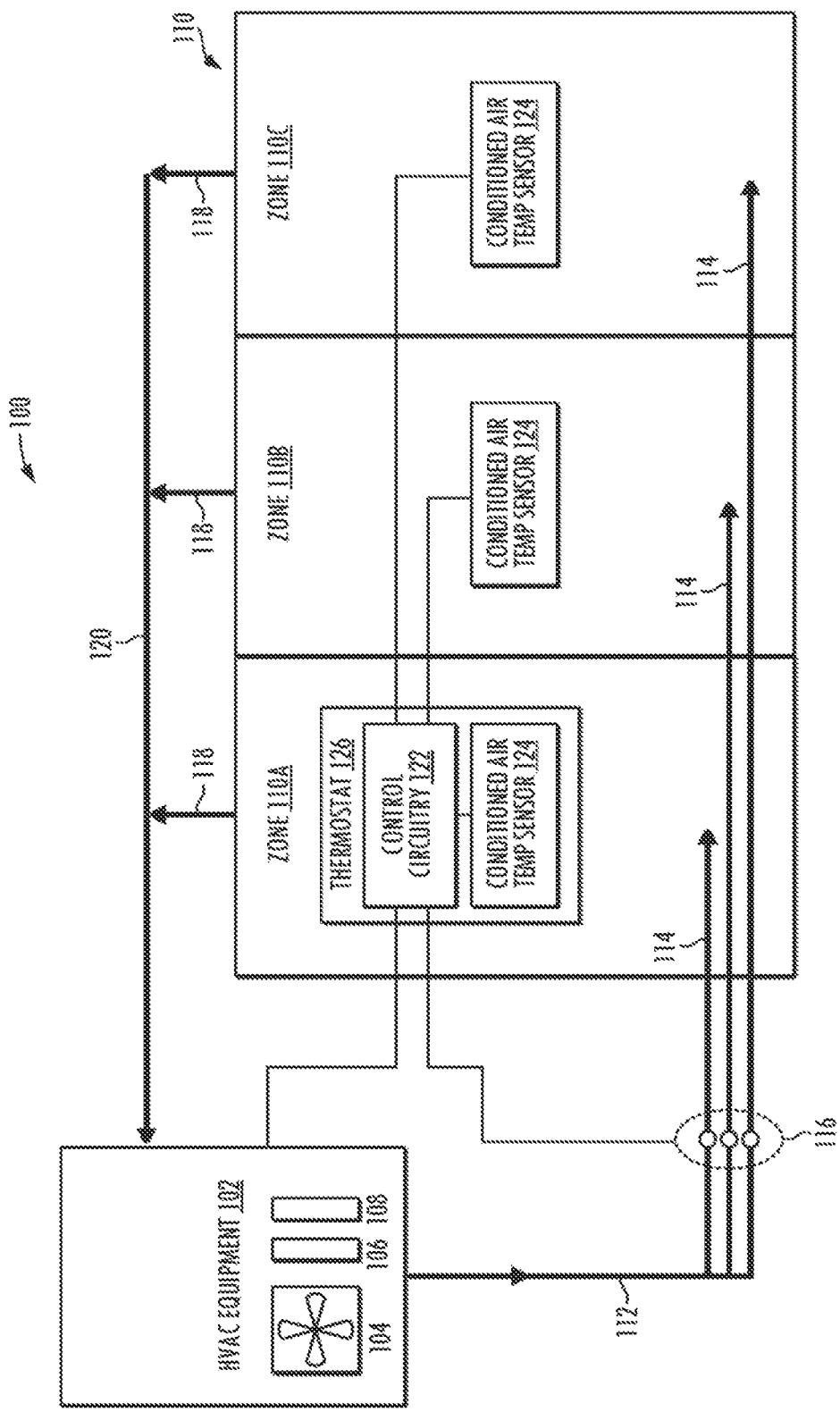
FIG. 1 is a block diagram of a heating, ventilation, and air conditioning (HVAC) system according to some example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," "observation" and similar terms may be at times used interchangeably.

Example implementations of the present disclosure provide an HVAC system and an associated model-based capacity control of the HVAC system. The model-based capacity control in some examples determines how to allocate the capacity between the zones calling for heating or cooling relief. In some instances, this model-based capacity control further distributes this capacity to non-calling zones. In some examples, the model receives various information associated with the zones, and uses this information to determined requested capacity values for each zone. These requested capacity values, in some examples, are used to create target capacity values for each zone, and in some instances, these target capacity values are determined as a result of a comparison between the total requested capacity compared to the minimum and/or maximum capacity of the system. The target capacity values may be scaled down in response to the total requested capacity being greater than the maximum capacity of the HVAC system, or other instances, these target capacity values may be scaled up in response to the total requested capacity being less than the minimum capacity of the HVAC system. In some examples, HVAC system provides relief based on the targeted capacity values.

FIG. 1 is a block diagram of an HVAC system 100 according to some example implementations of the present disclosure. The HVAC system generally includes HVAC equipment 102 with a fan 104, cooling element 106, and/or heating elements 108. The fan 104 may be an indoor fan or blower configured to provide conditioned air to a conditioned space 110, which in some examples may be divided into a plurality of zones 110A, 110B, 110C (each of which may itself be a conditioned space). It will be appreciated that while three zones are shown, any number of zones may be present provided there are at least two. It will also be appreciated that references to the conditioned zone may be equally applicable to one or more zones of the conditioned space, each of which, again, may itself be a conditioned space.

The HVAC equipment 102 may include an indoor unit, an outdoor unit, and a refrigerant loop extending between the indoor unit and the outdoor unit. The indoor unit may include a furnace or air handler, an indoor refrigerant heat exchanger or evaporator to condition air (heat or cool), and the fan 104 to circulate or otherwise provide the conditioned air to the conditioned space. The outdoor unit may include an outdoor fan and an outdoor refrigerant heat exchanger or condenser, and the refrigerant loop may extend between the indoor and outdoor refrigerant heat exchangers.

The HVAC equipment 102 may further include a cooling element 106, such as cooling coils used to cool and condition the air provided to the various zones. In some examples, the system utilized refrigerant cooling coils, and provides a direct exchange of heat between the conditioned air and the refrigerant. Other cooling elements or fluids may also be utilized including hydronic/water coils, etc. Similarly, the HVAC system 100 may utilize a variety of different heating elements 108, such as electric, gas, refrigerant heated coils, hydronic/water heated coils, etc. In some examples, the cooling element 106 and the heating element 108 may be the same indoor coil in a heat pump system. Regardless, the HVAC equipment may be arranged to provide staged capacity relief. In some examples, multiple cooling and/or heating elements are provided to allow the HVAC system to provide staged capacity to the system in either cooling or heating mode. In some examples, the fan is similarly configured to operate at set stages to provide staged capacity to the zones calling for conditioning relief. In other examples, the cooling element, heating element, and/or fan may be continuously adjusted over a set range or range(s) allowing the system to adjust the capacity provided in a continuous or substantially continuous manner over that range.

In some examples, the HVAC system 100 may include an air circulation path with supply air ducts including a main supply air duct 112 and zone supply air ducts 114 through which the conditioned air from the HVAC equipment 102 is provided to the zones 110A, 110B, 110C of the conditioned space 110; and to control airflow to the zones, the HVAC equipment may include zone dampers 116. The air circulation path also includes return air ducts including zone return air ducts 118 and a main return air duct 120 operably coupleable with the HVAC equipment, and through which air in the zones of the conditioned space is returned to the HVAC equipment as return air.

The HVAC system 100 includes control circuitry 122 operably coupled with the HVAC equipment 102, and configured to control the HVAC equipment to provide the conditioned air to heat or cool the conditioned space 110, or in some examples, zones 110A, 110B, 110C of the conditioned space. In some examples, the control circuitry is configured to control the HVAC equipment based on environmental feedback from one or more sensors operably coupled to the control circuitry. In this regard, the HVAC system may include at least one temperature sensor, and the control circuitry may be configured to control the HVAC equipment to provide the conditioned air based on observations of measured temperature so that zone temperature is maintained at or near its setpoint temperature.

In particular, for example, the HVAC system 100 may include a conditioned air temperature sensor 124 in the conditioned space 110 configured to measure temperature in the conditioned space. In some examples, as shown, one or more of the zones 110A, 110B, 110C may include a respective conditioned air temperature sensor for the zone and configured to measure temperature in the zone. In some examples, the control circuitry 122 (or some portion of the control circuitry) and the conditioned air temperature sensor may be co-located in a thermostat 126. In other examples, the control circuitry and the conditioned air temperature sensor may be separated and connected by wire or wirelessly; and in some of these examples, the conditioned air temperature sensor may be co-located with other electronic devices or circuitry such as a display device, network adapter, or the like.

According to some example implementations of the present disclosure, the control circuitry 122 is configured to receive zone priority levels and zone temperature setpoint values. In some examples, the control circuitry receives an indication of the zone ambient temperature values.

The zone priority levels may be provided by the installer and each zone is given a priority level, potentially a priority level of low, medium, or high. In some examples, the control circuitry maps a low priority level to a zone priority level numerical valve of 1, a medium priority level to a zone priority level numerical value of 2, and a high priority level to a zone priority level numerical valve of 4. Other values or weightings may be used, however, typically, at least one of the zones has a zone priority level higher than the other zones.

In some examples, the control circuitry 122 receives the priority levels through a user interface. The user interface may use zone proximity sensor measurements and associated logic to determine the priority levels. The priority levels may be based on the schedule of time intervals, and in these instances, the schedule may include zone priority levels and/or the time intervals may provide an indication of the priority levels for the various zones. For example, a zone associated with a bedroom may have a first priority during the night and a second priority during the day. The priority during the night might be higher, consistent with use of the bedroom for sleeping during the night. In another example, the priority level associated with a family room may be different for week days, e.g., lower, than the weekend, e.g., higher.

The control circuitry 122 may receive information associated with each zone, such as the zone size value, the requested operating mode (e.g., heating or cooling mode), the current zone ambient temperature value (e.g., the zone temperature measurement), and/or the current zone temperature setpoint (e.g., the desired temperature for the zone). This zone information may be provided as the output from each zone controller (potentially directly from a thermostat 126 or other controller).

The control circuitry 122 may be configured to determine requested zone capacity values. These values may be directed to maintaining the ambient temperature of one or all of the zones within a given threshold range or deviation associated with the respective zones. These requested zone capacity values may be normalized values, and the normalized values can be used to calculate the total capacity requested, and potentially, a normalized airflow requested for each zone.

In some examples, the control circuitry 122 determines the requested zone capacity values using a parallel form proportional integral (PI) process. This PI process may use the temperature error, which may be defined as the difference between the measured temperature and the temperature setpoint, as an input. The PI process uses this temperature error input and provides normalized requested zone capacity values as an output.

Before diving into the details of an example PI process, an overview of this process is first described. The control circuitry 122 may receive a signal that conveys the current zone ambient temperature value, and in some examples, pass this signal through an inverse filter (signal processing filter) to recover some of the phase shift and lost signal content. The control circuitry may compare the current zone ambient temperature value to a current zone temperature setpoint to determine a temperature feedback error.

In some examples, the temperature feedback error is used in cooling and heating PI process loops, which may be run in parallel for the zones, or potentially, only for active zones. The PI loops utilize configurable proportional and integral gains, and the output of the PI loop may be normalized requested capacity values for each zones. These normalized capacity value may be converted to the nominal unit capacity for the HVAC system 100 operating a single zone. In some multi-zoned HVAC systems, the control circuitry may convert the normalized capacity value for each zone into the maximum zone capacity value for that zone. In either instance, the converted nominal unit capacity value or the maximum zone capacity value may be used as the requested zone capacity value.

In some examples, the control circuitry also either determines or receives the requested zone operating mode. The operating mode for each zone may be determined through an external input, e.g., user input, or automatically via the control circuitry.

To walk through these steps in more detail, the control circuitry 122 may use an inverse filter to refine the measured temperature and improve the overall system response. This filtering may reduce the signal phase shift and/or recover some of the higher frequency temperature content, both of which are often lost due to the physical time constant of the sensor. As a result, this filtering may result in less oscillation and/or better control of the HVAC system 100. In some examples, the inverse filter used calculates the lost frequency content by taking the derivative of the temperature signal. This derivative value is then multiplied by the physical time constant of the sensor added to the digital infinite impulse response (IIR) time constant, which provides the filtered measured temperature value. In some examples, the filtering process is bypassed if the temperature is outside the bounds 40° to 140° F.

The control circuitry 122 may use the zone ambient temperature values, potentially the measured values or the filtered values, to determine the zone target capacity values. This determination may be performed for each zone, and a feedback loop may be used in order to determine these capacity values.

Each active zone may have its own independent PI loop, and the PI loop for all (or all active) zones may be run in parallel. These PI loops may determine the requested normalized capacity for a given zone, NormCap, by adding together a proportional term, PTerm, and an integral term, ITerm, for that zone. For example, these PI loops may determine this normalized value using the below equation:

$$\text{NormCap} = I\text{Term} + P\text{Term} \tag{E1}$$

Both the proportional term, PTerm, and the integral term, ITerm, used in equation (E1) may be based, at least in part, on a calculation of the temperature error, TempErr, for a given zone. This temperature error may be defined as the difference between the measured temperature of each zone and the temperature setpoint for that zone. These temperature errors may be calculated using equations (E2) and (E3) below. For zones operating in heating, equation (E2) may be used:

$$\text{TempErr} = \text{HeatingSetpoint} - IDT \tag{E2}$$

For zones operating in cooling, equation (E3) may be used:

$$\text{TempErr} = IDT - \text{CoolingSetpoint} \tag{E3}$$

In equation (E2) and (E3), the temperature error is represented as TempErr, the zone temperature setpoints are represented as HeatingSetpoint and CoolingSetpoint, respectively, and the zone ambient temperature value is represented as IDT.

This temperature error, TempErr, may be used to determine the proportional term, PTerm, for a given zone. For example, this proportional term may be determined by multiplying the temperature error by a proportional gain term using the below equation:

$$P\text{Term} = Kp \times \text{TempErr} \tag{E4}$$

In equation (E4), the proportional gain term is represented as Kp and the proportional term is represented as PTerm.

The temperature error, TempErr, may also be used to determine the integral term, ITerm, for a given zone. In some of these examples, the control circuitry applies a saturation error to the integral term, which may prevent any integral windup. This saturation error may be based, in part, on the temperature error. For example, the saturation error, SatErr, may be determined based on the below equation:

$$\text{SatErr} = \min(\max(\text{TempErr}, -\text{DISLimit}), \text{DISLimit}) \tag{E5}$$

In equation (E5), the saturation error is determined using two values, the temperature error, TempErr, and a separate maximum limit, DISLimit. In this example, the temperature error, TempErr, is used as the saturation limit only if the temperature error is between this maximum limit. In some examples, the maximum limit may default to 1, in which case, the temperature error becomes the saturation error only if the measured temperature is within 1° F. of the temperature setpoint.

In some examples, this saturation error, SatErr, is used with an integral gain constant Ki, to determine an updated integral term using the following equation:

$$I\text{Term} = I\text{Term} + Ki \times \text{SatErr} \tag{E6}$$

In equation (E6), the integral term is calculated from the prior integral term and adjusted based on the product of the saturation error and the integral gain constant. In some examples, the saturation error is not used, and the integral term may be determined based on the prior integral term value and a constant.

As discussed above, once calculated, the proportional term, ITerm, and integral term, PTerm, may be added together to get the requested normalized capacity, NormCap, again on a per zone basis.

In some examples, the normalized capacity value is rate saturated to prevent excessive fluctuation not caused by changes to the temperature setpoint. This rate saturated process may be performed as follows:

```
dNormCap = NormCap - NormCap_last
if( |TempErr - TempErr_last| ≤ 1.0)
   if(dNormCap > NormCapRateSatLimit)
      ITerm = NormCap_last + NormCapRateSatLimit - PTerm
   elseif(dNormCap < -NormCapRateSatLimit)
      ITerm = NormCap - NormCapRateSatLimit - PTerm
   end
end
NormCap = ITerm + PTerm
NormCap_last = NormCap
TempErr_last = TempErr
```

To walk through the above process, if the current change in the temperature error, TempErr, of a given zone is above a given limit, which in the above example is 1° F., the system does not recalculate the integral term, ITerm. Thus, in these instances, the requested normalized capacity, NormCap, remains unchanged. If the current change in the temperature error, TempErr, of a given zone is within the specified limit, which again in the above example is 1° F., the system redetermines the integral term, ITerm. In these examples, the system compares the capacity change, dNormCap, to a normalized capacity saturation limit, NormCapRateSatLimit. The capacity change, dNormCap, is defined as the current normalized capacity, NormCap, subtracted from the last normalized capacity, NormCap_last. The normalized capacity saturation limit, NormCapRateSatLimit, is a configurable parameter that may have a default value of 0.01. If the capacity change is within a range defined by the normalized capacity saturation limit, the integral term may be recalculated using that normalized capacity saturation limit. Once the integral term, ITerm, has been recalculated a new normalized capacity, NormCap, is determined.

In some examples, the requested normalized capacity is saturated to be within the normalized capacity limits for each zone. For a single zone system, the normalized capacity limits may be calculated based on the capacity limit of the currently available HVAC stages. For multi-zone systems, the normalized capacity limits may have their limits set based on the maximum allowed capacity for each zone. In some examples, the control circuitry allows the system to build an oversaturation level.

In examples where the normalized capacity is saturated to be within the normalized limits of the system or zone, the following method may be used:

```
OverSat = 0.25
if (NormCap > MaxNormCap + OverSat)
    ITerm = MaxNormCap + OverSat − PTerm
elseif (NCap < MinNormCap − OverSat)
    ITerm = MaxNormCap + OverSat − PTerm
end
NormCap = min(max(NCap,MmNCap),MaxNCap)
```

To walk through this process, the oversaturation desired load is represented by OverSat, and this oversaturation may help to prevent excessive stage switching. If no oversaturation is desired this value may be set to zero, however, the following example walks through this process with a default oversaturation value of 0.25. In this process, the current normalized capacity, NormCap, is compared with the maximum normalize capacity, MaxNormCap, and the minimum normalized capacity, MinNormCap, to determine if any changes need to be made to the integral term, ITerm, which would further impact the requested normalized capacity value, NormCap. As shown above, when an oversaturation value is used, the maximum normalized capacity and the minimum normalized capacity are adjusted based on that oversaturation value.

In the above saturation process, the system adjusts the integral term, ITerm, in one of two scenarios. First, this term is adjusted if the requested normalized capacity is greater than the maximum normalized capacity plus the oversaturation value. Second, this term is adjusted if the requested normalized capacity is less than the minimum normalized capacity minus the oversaturation value. If neither scenario is present in this example, the integral term, ITerm, is unchanged by this saturation process.

Regardless, of whether the integral term changes, the requested normalized capacity in this example, is determined as one of the following: the minimum capacity for a given zone, the maximum capacity of the zone, or the requested capacity as determined using the integral term and the proportional term according to the process described above.

In some examples, to prevent windup, the recalculated integral term is saturated after each recalculation step. This saturation may be done as follows:

$$ITerm = max(ITerm, MinNCap-OverSat) \tag{E7}$$

$$ITerm = min(ITerm, MaxNCap+OverSat) \tag{E8}$$

In some examples, in the saturation process, the default value for minimum capacity, MinNCap, may be 0.

In some examples, the control circuitry 122 further either determines or receives the zone operating mode. Each zone may independently request an operation mode, and this request may be made either automatically using the control circuitry or through a user input. The requested mode may be different than the current HVAC system mode, and in some examples, when the request mode for a zone is different from the current HVAC system mode, that zone is turned off or the request is ignored.

In some instances, when the operating mode is set by the user (e.g., not automatically determined) the control circuitry 122 includes a minimum off time requirement for the operation switch. For example, if during operation, a user changes the requested mode between heating and cooling, the control circuitry will set the mode to off temporarily. Once the off time exceeds the minimum off time for this mode switch, the control circuitry changes the requested operating mode to the new operating mode set by the user.

In some instances, when the operating mode is set automatically, the control circuitry 122 will determine the operating mode as a function of the measured temperature, the heating setpoint, and the cooling setpoint. The control circuitry may switch the operating mode of a zone from heating to cooling when a calculated cooling error is above a switchover error limit. Similarly, the control circuitry may switch the operating mode of a zone from cooling to heating when a calculated cooling error is above a switchover error limit. In both of these instances, the control circuitry may shut the zone off for a certain minimum time before completing the operating mode switch. In some examples, the switchover error limit is the difference between the cooling mode setpoint and the heating mode setpoint. The control circuitry may operate similarly with respect to the HVAC system 100 overall.

The control circuitry 122 may determine target zone capacity values for each zone, and potentially adjusts these values based on a saturation limit. Said another way, the control circuitry may determine how much capacity the HVAC equipment 102 may be able to deliver to a given zone, and may also determine if other factors are at play which may further limit the capacity that the system may provide. For example, some systems may include noise constraints that may limit the capacity that may provide to a given zone.

In some examples, the control circuitry determines a normalized zone capacity size for each zone. This normalized capacity, ZoneNormCapSize, for each zone is based on the airflow capacity size, ZoneAirflowSize. In some examples, this normalized capacity size may be determined using the below equation:

$$ZoneNormCapSize = \\ ZoneAirFlowSize \times \frac{NominalCFMperTon}{CFMperTon} \times \frac{NominalIDAirflow}{NominalAirflow} \tag{E9}$$

In equation (E9), the zone airflow size value for each zone is represented as ZoneAirflowSize. In some examples, the zone airflow size values are determined based on a measure of the normalized airflow that would flow through a branch at an expected or nominal pressure differential based on a given demand or operation level. In some examples, this zone size value is based on information received from the zone controller or thermostat. In some examples, the zone airflow size valve is an output of an airflow distributer process described more fully in a previously filed application (U.S. application Ser. No. 17/082,771, entitled "Model-Based Control of Zone Dampers in an HVAC System," filed on Oct. 28, 2020), which is incorporated herein by reference.

In equation (E9), the NominalCFMperTon value corresponds to a nominal CFM per ton value for the overall HVAC system. This nominal CFM per ton value may be a fixed value, and in some examples, it corresponds to the rated CFM per ton value for the HVAC system. The CFMperTon value corresponds to the CFM per ton value for the current or measured operation of the HVAC system at a given demand or operation level. The NominalIDAirflow corresponds to the nominal indoor unit air flow and relates to a fixed value for the overall indoor unit in the HVAC system, potentially the rated value for the system. The NominalAirflow indoor unit air flow relates to the current or measured operation of the HVAC system at a given demand or operation level.

In some examples, the control circuitry 122 repeats this process for each zone, determining the normalized zone capacity size, ZoneNormCapSize, for each zone.

Some systems also include additional limits on capacity. In these system, the process for determining the zone capacity size may also include adjustments accounting for these limits. One example limit is based on noise level limits. These examples may include a noise reduction factor parameter, which may be defined on a per zone basis. This noise reduction factor parameter may have a value equal to or less than 1.0, where a lower noise reduction factor parameter value reduces the amount of capacity that can be delivered to a given zone, which in turn may limit the noise level of that zone. In these examples, the revised capacity size may be calculated using the below equation:

$$\text{ZoneMaxNCapSize} = \text{ZoneNormCap} \times \text{NoiseReductionFactor}_{zone} \quad (E10)$$

In equation (E10), the noise capped target zone capacity value for each zone, ZoneMaxNCapSize, is determined using the target zone capacity value, ZoneNormCapSize, and the reduction factor parameter, $\text{NoiseReductionFactor}_{zone}$.

The control circuitry 122 may also rescale the zone size parameter by using the ZoneAirflowSize, the NominalCFMperTon, the CFMperTon, the NominalIDAirflow, the NominalAirflow, and the $\text{NoiseReductionFactor}_{zone}$. This may be accomplished using the below equation:

$$Size_{Zone[N]} = ZoneAirflowSize[n] \times NoiseReductionFactor_{Zone[n]} \times \frac{NominalCFMperTon}{CFMperTon} \times \frac{NominalIDAirflow}{NominalAirflow} \quad (E11)$$

In equation (E11), $Size_{Zone[N]}$ is the rescaled zone capacity size parameter. In this disclosure, equations using the rescaled zone size parameter value may also use the unscaled zone size parameter value unless indicated otherwise or clear from the context.

The requested zone capacity value, $ReqCapacity_{Zone[N]}$, may also be rescaled based the noise reduction factor parameter, $NoiseReductionFactor_{zone}$. These rescaled zone capacity values may be determined based on the following equation:

$$ReqCapacity_{Zone[N]} = \frac{ReqCapacity_{Zone[N]}}{NoiseReductionFactor_{zone}} \quad (E12)$$

In some examples, the requested zone capacity values, $ReqCapacity_{Zone[N]}$, in equation (E12) are the same as the previously discussed normalized requested zone capacity values, NormCap.

The control circuitry 122 may use the requested zone capacity values (either rescaled based on a noise reduction factor or not) and determine how to allocate loads between zones based on the zone priority level, zone ambient temperatures value, and zone size parameters (again either rescaled based on a noise reduction factor or not).

In order to determine the requested zone capacity values, the control circuitry 122 may determine a total requested zone capacity value, TotalRequestedCapacity, by scaling the normalized zone capacity values for each zone by the zone size value for the respective zones. These values may then be summed for all of the active zones to determine the total requested zone capacity value. Equation (E13) provides an example of this process:

$$\text{TotalRequestedCapacity} = \Sigma_{N=ActiveZones} (ReqCapacity_{Zone[N]} \times Size_{Zone[N]}) \quad (E13)$$

The control circuitry 122 may be configured to determine target zone capacity values from the requested zone capacity values, the zone size values, and from the zone priority levels. These target zone capacity values may be determined in response to the total requested zone capacity values, potentially calculated using equation (E13), being either less than a minimum capacity value or greater than a maximum capacity value for the HVAC system 100.

In some examples, the control circuitry 122 operates the HVAC system nominally if the total requested capacity is higher than the minimum capacity and lower than the max capacity of the current stage. In these examples, the target zone capacity values may be determined using the normalized requested zone capacity values for each zone. For example, the target zone capacity values for each zone may be determined by scaling the normalized requested zone capacity values for each zone by the zone size parameter value as follows:

$$NormCapacity_{Zone[N]} = ReqCapacity_{Zone[N]} \times Size_{Zone[N]} \quad (E14)$$

In equation (E14), the target zone capacity values are represented as $NormCapacity_{Zone[N]}$.

In some examples, if the total of the requested zone capacity value is greater than the maximum capacity, e.g., the HVAC system 100 or stage has a capacity deficit, the control circuitry 122 is configured to determine the target zone capacity values by scaling down the target zone capacity values based on the maximum capacity and the zone priority levels. In these examples, the target zone capacity values may be scaled down by taking the zone priority values and current temperature feedback error into account.

In instances in which a capacity deficit exists, the control circuitry 122 may determine target zone capacity values using redistributed capacity values for each zone. These redistributed capacity values can be based on the maximum capacity, the target zone capacity values, and zone cost values. For example, the control circuitry may determine the capacity excess or deficit for each zone. These values may be the difference between a given determined target zone capacity value and the redistributed zone capacity value for each zone. The control circuitry may then redetermine the target zone capacity values based on the redistributed zone capacity value as well as the capacity excess or deficit value.

To walk through this process further, the redistributed capacity values for each zone may be determined using the following equation:

$$RedistributedCap_{Zone[N]} = \\ MaxCapacity \cdot \frac{NormCapacity_{Zone[N]} \cdot Cost_{Zone[N]}}{\Sigma(NormCapacity_{Zone[N]} \cdot Cost_{Zone[N]})} \quad (E15)$$

In equation (E15) the redistributed capacity value, RedistributedCap$_{Zone[N]}$, for each zone are based on the maximum capacity of the system, MaxCapacity. This maximum capacity value is applied to a zone specific ratio based on the previously determined target capacity value and a cost value for a given zone compared to similar values for all the zones. In particular, the numberator of the ratio is the result of the product of the previously determined target capacity value and the cost value for a given zone, NormCapacity$_{Zone[N]}$·Cost$_{Zone[N]}$. The denominator of this ratio is the similar product determination for all active zones sumed, e.g., $\Sigma$(NormCapacity$_{Zone[N]}$·Cost$_{Zone[N]}$). The redistributed capacity value, RedistributedCap$_{Zone[N]}$, for each zone is the result of this ratio applied to the maximum capacity of the system.

Qualitatively, the zone cost values used in equation (E15) represent a loss of comfort for a given zone, and in some instances, these zone cost values may be numerically determined as a function of the zone ambient temperature error values and the zone priority levels. The zone ambient temperature error values represent the difference between the measured temperature in a given room and the desired temperature or temperature setpoint of the room. The zone priority level represents the relative importance of satisfying the load for a given zone. Using these values, the zone cost values may be determined using the following equation:

$$Cost_{Zone[N]} = (1 + SysModeError_{Zone[N]}) \cdot Priority_{Zone[N]} \quad (E16)$$

In equation (E16), the zone ambient temperature error value is represented by SysModeError$_{Zone[N]}$, and the zone priority level is represented by Priority$_{Zone[N]}$. These values are used to determine the zone cost value represented by Cost$_{Zone[N]}$. This cost value may then be feed up to equation (E15) to determine the redistributed capacity values.

Some implementations of this process may further use a cost function to determine the zone ambient temperature error value, SysModeError$_{Zone[N]}$, used in equation (E16). This additional cost function may reduce oscillation in the redistributed capacity values by limiting the variation associated with the zone ambient temperature error value. In some examples, this cost function uses a first order infinite impulse response function (an IIR function), and potentially the following equations:

$$FilteredCoolError_{Zone[N]} = \\ FilteredCoolError_{Zone[N]} \times \left(\frac{\tau-1}{\tau}\right) + \left(\frac{CoolError_{Zone[N]}}{\tau}\right) \quad (E17)$$

$$FilteredHeatError_{Zone[N]} = \\ FilteredCoolError_{Zone[N]} \times \left(\frac{\tau-1}{\tau}\right) + \left(\frac{HeatError_{Zone[N]}}{\tau}\right) \quad (E18)$$

In the above equations (E17 and E18), zone ambient temperature error value, SysModeError$_{Zone[N]}$, from equation E16 is represented as CoolError$_{Zone[N]}$ for a zone operating in cooling mode, and represented as HeatError$_{Zone[N]}$ for a zone operating in heating mode. The filtered zone ambient temperature error is represented as FilteredCoolError$_{Zone[N]}$ for a zone operating in cooling mode, and represented as FilteredHeatError$_{Zone[N]}$ for a zone operating in heating mode. The above equations, in some instances, use the unfiltered zone ambient temperature error value as the initial FilteredCoolError$_{Zone[N]}$ or FilteredHeatError$_{Zone[N]}$. The time constant in the above equations, $\tau$, is a constant time value, potentially 600 seconds.

Once determined, the redistributed capacity values may be used by the control circuitry 122 to determine a zone capacity excess or deficit value for each of the zones. These zone capacity excess or deficit value may be the difference between the previously determined target zone capacity value and the redistributed zone capacity value for each zone. In some examples, the excess and needed capacity for all zones after redistribution are calculated:

$$ExcessCap_{Zone[N]} = \max(0, RedistributedCap_{Zone[N]} - NormCapacity_{Zone[N]}) \quad (E19)$$

$$NeededCap_{Zone[N]} = \max(0, NormCapacity_{Zone[N]} - RedistributedCap_{Zone[N]}) \quad (E20)$$

In the above equations (E19 and E20), the excess capacity for a given zone is represented as ExcessCap$_{Zone[N]}$ and the needed capacity is represented as NeededCap$_{Zone[N]}$.

The control circuitry 122 may then redetermine the target zone capacity values based on the redistributed zone capacity value and the capacity excess or deficit value for each zone. In some examples, the redetermined target zone capacity values are calculated using the below equation:

$$ReDetNormCapacity_{Zone[N]} = RedistributedCap_{Zone[N]} - \\ ExcessCap_{Zone[N]} + \Sigma(ExcessCap_{Zone[N]}) \frac{NeededCap_{Zone[N]}}{\Sigma NeededCap_{Zone[N]}} \quad (E20)$$

In equation (E20), the redetermined target zone capacity value is represented by ReDetNormCapacity$_{Zone[N]}$.

To walk through this equation in more detail, in some examples, the redetermined target zone capacity value for a given zone is set to be equal to the previously calculated redistributed capacity value for that zone, potentially calculated using equation (E15) above. Because the system has a capacity deficit, the redistributed capacity value is then subtracted from the excess capacity for that zone, and in some instances, the resulting value becomes the redetermined target zone capacity value. In those instances, the needed capacity value for the zone would be zero because a given zone cannot both have excess capacity and need capacity at the same time. As a result, the remainder of the equation zeros out, and again, the redetermined target zone capacity value becomes the redistributed capacity value subtracted from the excess capacity for that zone.

However, if a given zone has needed capacity, the excess capacity value would be zero. As a result, the control circuitry 122 then redistributes the total excess capacity, $\Sigma$(ExcessCap$_{Zone[N]}$), to each zone in need of capacity based on the ratio of the needed capacity for that zone compared to the capacity of all the needed zones, $\Sigma$NeededCap$_{Zone[N]}$. Thus, in some instances, for zones needing capacity, the redetermined target zone capacity value becomes the redistributed capacity value for that zone added to the ratio of the needed capacity provided to that zone verse all zones in need of capacity.

Following this redistribution process, the control circuitry 122 may determine whether the system still has a capacity deficit, and if so, the above process is repeated. In these instances, the control circuitry may recalculate the total requested capacity values, TotalRequestedCapacity, based on the redetermined target zone capacity values. Equation (E21) shows an example of this recalculation:

$$\text{TotalRequestedCapacity} = \Sigma(\text{ReDetNormCapacity}_{Zone[N]}) \quad (E21)$$

If the total requested capacity value in equation (E21) is still greater than the maximum capacity of the system, the above redistribution process may be performed again.

The control circuitry 122 may also determine the target zone capacity values by scaling up the target zone capacity values. This scaling up may be based on the minimum capacity and respective proportions of a total of the target zone capacity values, and in some instances, this scaling up is responsive to the total of the requested zone capacity values being less than the minimum capacity, e.g., the HVAC system 100 or stage has excess capacity.

In some instances in which a capacity excess exists, the control circuitry 122 determines that one or more of the scaled up target zone capacity values is greater than a respective maximum zone capacity. This determination indicates to the system that a capacity excess exists, and the control circuitry 122 may then determine how to redistribute this capacity. In these instances, the control circuitry may redetermine the target zone capacity values to distribute the excess capacity from the zone(s) to one or more other zones. These redetermined target zone capacity values may be based on the scaled up target zone capacity value and the zone priority levels. The control circuitry may also determine that one or more of the other zones, e.g., zones without excess capacity based on the scaled up values, have a lower priority level. In these instances, one or more of these other zones also has available relief, and the control circuitry may redetermine the target zone capacity values by distributing the excess capacity to the one or more other zones proportional to the zone cost values and the available zone relief capacity. In some instances, the zone cost values may be a function of the scaled up target zone capacity values.

In some instances in which a capacity excess exists, the control circuitry 122 scales up the target zone capacity values based on the minimum value capacity value for the HVAC system 100 or stage. In some examples, this is done while preserving the relative shape between the zone requests. These scaled up target zone capacity values may be determined using the following equation:

$$ScUpNormCapacity_{Zone[N]} = MinNCap \cdot \frac{NormCapacity_{Zone[N]}}{\Sigma(NormCapacity_{Zone[N]})} \quad (E22)$$

In equation (E22), the scaled up target zone capacity value for each zone is represented as $ScUpNormCapacity_{Zone[N]}$.

If the scaled up target zone capacity value for each zone is lower than the zone size for the zones calling for relief, the HVAC system may not further adjust the target zone capacity values. The control circuitry may simply cycle the HVAC system to provide relief when the requested demand is higher.

If the scaled up target zone capacity value for one or more zones is higher than the zone size for the respective zone(s) calling for relief, then the control circuitry 122 may redistribute the excess capacity. If in these instances, all the zones calling for the selected heating or cooling relief have low priority, then the relief may only be provided to the low priority zones calling for the relief In these instances, the control circuitry may confirm that the sum of the zone sizes for the zones calling for relief is greater than the lowest stage minimum capacity value for the HVAC system. If this sum is not greater than the lowest stage minimum capacity value, the call for relief is prevented, and the control circuitry cycles the HVAC system to provide relief when the requested demand is higher. In these instances, if the sum of the zone sizes calling for relief is greater than the lowest stage minimum capacity value for the HVAC system, the control circuitry confirms the sum of the rescaled target zone capacity values is greater than the lowest stage minimum capacity value for the HVAC system. In these instances, if the sum of the rescaled target zone capacity values is greater than the lowest stage minimum capacity value for the HVAC system, the control circuitry requests the highest capacity the zone sizes can handle without having excess capacity.

If the total rescaled target zone capacity values for the zones requesting relief is lower than the minimum capacity for the lowest stage of the HVAC system, the target zone capacity values are rescaled up based on the minimum capacity for the lowest stage. In these instances, the rescaled target zone capacity values may be compared against the minimum capacity values for each zone to determine the available relief and needed excess for each zone. In these instances, the available relief and needed excess may be determined as follows:

$$\text{ExcessCap} = \max(0, ScUpNormCapacity_{Zone[N]} - Size_{Zone[N]}) \quad (E23)$$

$$\text{ReliefCap} = \max(0, Size_{Zone[N]} - ScUpNormCapacity_{Zone[N]}) \quad (E24)$$

In some instances, equations (E23 and E24) are only performed for zones requesting relief. In equation (E23) the excess capacity, ExcessCap, for a given zone is determined by subtracting the scaled up target zone capacity value from the zone size. This value is set to zero for zones with available relief In equation (E24) the available relief capacity, ReliefCap, for a given zone in these equations is determined by subtracting the zone size by the scaled up target zone capacity value. This value is set to zero for zones with excess capacity or zones that are not requesting relief.

In some examples, the excess capacity determined using equations (E23) and (E24) are redistributed to the low priority calling zones. This redistribution may be proportional and performed according to the following cost functions:

$$\text{Cost} = \frac{ScUpNormCapacity_{Zone[N]} \times (ReliefCap > 0)}{\Sigma(ScUpNormCapacity_{Zone[N]} \times (ReliefCap > 0))} \quad (E25)$$

$$ReDisNormCapacity_{Zone[N]} = ScUpNormCapacity_{Zone[N]} + \quad (E26)$$
$$ScUpNormCapacity_{Zone[N]} + (\Sigma ExcessCap) \times Cost - ExcessCap$$

In equation (E25), the cost value, Cost, is determined as a ratio between the scaled up target zone capacity value for a given zone with available relief capacity, $ScUpNormCapacity_{Zone[N]} \times (ReliefCap>0)$, to the total scaled up target zone capacity value for all the zones requesting relief with available relief capacity, $\Sigma(ScUpNormCapacity_{Zone[N]} \times (Re-$ liefCap>0)). This cost value is used to redetermine the target zone capacity values, ReDisNormCapacity$_{Zone[N]}$, for the active zones using equation (E26). This equation sets the redetermined target zone capacity value to the scaled up target zone capacity value, ScUpNormCapacity$_{Zone[N]}$. It then distributes the total calculated excess capacity to each zone using the cost value, (ΣExcessCap)×Cost. Finally it subtracts any excess capacity, ExcessCap, for a given zone.

After the redistribution based on cost is performed, the excess capacity may be redetermined. If excess capacity still exists, the process is repeated until the excess capacity for each zone reaches zero. In some implementations, the maximum number of iterations this process will be repeated is equal to the number of zones calling for relief in the selected mode of operation.

In some instances in which a capacity excess exists, and some of the zones calling for the selected heating or cooling relief have medium to high priority, the excess capacity may be redistributed based on a different cost function. In these instances, the following process may be used. First, the control circuitry calculates the excess capacity and available relief for all zones. The available relief capacity may be calculated separately for calling zones and non-calling zones. In some examples, the control circuitry uses the below equations to determine these values for each zone:

$$\text{ExcessCap} = \max(0, \text{NormCapacity}_{Zone[N]} - \text{Size}_{Zone[N]}) \quad (E27)$$

$$\text{CallReliefCap} = \max(0, \text{Size}_{Zone[N]} - \text{NormCapacity}_{Zone[N]}) \times (\text{NormCapacity}_{Zone[N]} \neq 0) \quad (E28)$$

$$\text{NonCallReliefCap} = \max(0, \text{Size}_{Zone[N]} - \text{Normcapacity}_{Zone[N]}) \times (\text{Normcapacity}_{Zone[N]} = 0) \quad (E29)$$

In the above equations, the excess capacity, ExcessCap, for a given zone is again determined by subtracting the scaled up target zone capacity value from the zone size, and this value is set to zero for zones with available relief capacity. In these equations the available relief capacity, ReliefCap, for a given zone calling for relief, CallReliefCap, and a zone not calling, NonCallReliefCap, are determined in the same manner. These available relief capacity values are determined by subtracting the zone size by the scaled up target zone capacity value, and the value is set to zero for zone needed capacity.

In these instances, if the total sum of the zones calling for relief capacity is higher than the sum of the excess capacity, then all of the relief capacity is distributed to the calling zones. This relief capacity may be distributed to the calling zones based on the contribution of each zone to a cost function. In some examples, this distribution is provided according to the following equation:

$$NormCost = \frac{Cost \times (CallReliefCap \neq 0)}{\Sigma Cost \times (CallReliefCap \neq 0)} \quad (E30)$$

$$ReDisNormCapacity_{Zone[N]} = \quad (E31)$$
$$ScUpNormCapacity_{Zone[N]} + NormCost \times \Sigma ExcessCap - ExcessCap$$

In equation (30), the normalized costs, NormCost, for each calling zone with available relief is calculated using a ratio of the cost for a given calling zone with available relief, Cost×(CallReliefCap≠0), to the sum of the costs for all the calling zones with available relief, ΣCost×(CallReliefCap≠0). This normalized cost value is used to redetermine the target zone capacity values, ReDisNormCapacity$_{Zone[N]}$, for the calling zones in equation (E33). In this equation, the redetermined target zone capacity values are set to the scaled up target zone capacity values, ScUpNormCapacity$_{Zone[N]}$. The equation then distributes the total calculated excess capacity to each zone using the normalized cost value, NormCost×ΣExcessCap. Finally it subtracts any excess capacity, ExcessCap, for a given zone.

Following this redistribution, if excess capacity still exists, the available relief and excess capacity for the calling zones is recalculated and redistributed using the above process. This process may be repeated only until all excess capacity is distributed, or until the control circuitry has performed this redistribution process a maximum number of times, potentially where the maximum number of times is equal to the number of zones calling for relief.

If the total sum of the zones calling for relief capacity is lower than the sum of the excess capacity, then the relief capacity may be distributed to both calling and non-calling zones. In these instances, this relief capacity may be distributed to the zones based on the contribution to the cost function provided by each zone. This distribution may be provided according to the following equation:

$$NNormCost = \frac{Cost \times (CallReliefCap + NonCallReliefCap) \neq 0)}{\Sigma Cost \times (CallReliefCap + NonCallReliefCap) \neq 0)} \quad (E32)$$

$$ReDisNormCapacity_{Zone[N]} = ScUpNormCapacity_{Zone[N]} + \quad (E33)$$
$$NormCost_{Zone[N]} + \Sigma ExcessCap \times Cost - ExcessCap$$

In these instances, equations (E32 and E33) may be performed for all zones regardless of whether they are calling for the systems overall conditioning or not. In equation (E32), the normalized cost, NNormCost, for each zone with available relief is calculated using a ratio of the cost for a given zone with available relief, Cost×(CallReliefCap+NonCallReliefCap)≠0), to the sum of the costs for all the zones with available relief, ΣCost×(CallReliefCap+NonCallReliefCap)≠0). Again, this normalized cost takes into account all zones with available relief regardless of whether they are calling for conditioning or not. This normalized cost value is used in equation (E34) to redetermine the target zone capacity values, ReDisNormCapacity$_{Zone[N]}$, for all the zones, again regardless of whether a given zone is calling for relief or not. In this equation, the redetermined target zone capacity values are set to the scaled up target zone capacity values, ScUpNormCapacity$_{Zone[N]}$. The equation then distributes the total calculated excess capacity to each zone using the normalized cost value, NormCost×ΣExcessCap. Finally it subtracts any excess capacity, ExcessCap, for a given zone.

In some examples, following this redistribution, if excess capacity still exists, the available relief and excess capacity for the calling zones are recalculated and redistributed using the above process. In some instances, this process is repeated only until all excess capacity is distributed, or until the control circuitry has performed this redistribution process a maximum number of times, potentially where the maximum number of times is equal to the number of zones calling for relief.

The cost values in the above equations (E30 and E32) may be calculated using the following process. The cost values may be determined by first determining a cost function error, CostErr, using the below equation:

CostErr=(RequestedMode$_{Zone[N]}$≠Off)×
  (SystemMode=Heating)×
  HeatError$_{Zone[N]}$ . . . +
  (RequestedMode$_{Zone[N]}$≠Off)×
  (SystemMode=Cooling)×
  CoolError$_{Zone[N]}$ . . . −
  (RequestedMode$_{Zone[N]}$=Off)×Priority$_{Zone[N]}$ (E34)

This cost function error, CostErr, penalizes delivering excess capacity to zones in the off state by setting their equivalent opposing mode error to their zone priority value. For example, in equation (E26) the cost function error is determined by summing the temperature error for the active zones. In particular, the heating error, $HeatError_{Zone[N]}$, which may be calculated using the above equation (E1), for all zones requested heating are first summed, $(RequestedMode_{Zone[N]} \neq Off) \times (SystemMode=Heating) \times HeatError_{Zone[N]}$. If a zone is not active or if the zone is not requesting heating, the value for this sum is set to zero. The cooling mode error, $CoolError_{Zone[N]}$, calculated using the above equation (E2), for all zones requested cooling are also summed, $(RequestedMode_{Zone[N]} \neq Off) \times (SystemMode=Cooling) \times CoolError_{Zone[N]}$. Often, all of the active zones will either be calling for heating or these zones will all be calling for cooling. Thus, in equation (E34) either the heating mode error sum or the cooling mode error sum are often zero, and only one of these sums is used. The resulting error sum is then subtracted from the sum of the priority levels for the inactive zones, $(RequestedMode_{Zone[N]}=Off) \times Priority_{Zone[N]}$.

This cost function error may then be used to calculate a cost value. For example, this cost value, Cost, may be calculated using the following equations:

$$Cost = CostErr \times (1 + max(Priority) - Priority_{Zone[N]}) \quad (E35)$$

$$Cost = (1 + Cost - min(Cost)) \quad (E36)$$

In some examples, the control circuitry 122 determines the requested zone capacity values from a weight averaged relative humidity value and a weight averaged temperature setpoint.

The control circuitry 122 may determine a weight averaged relative humidity value from the zone ambient temperature values, zone dewpoint values, and the zone priority levels. For example, the control circuitry may receive a zone dewpoint value associated with each of the active zones. The dewpoint values can be calculated as a function of the zone ambient temperature value and the relative humidity associated with each zone. For zones with multiple relative humidity and/or temperature sensors, these zones may provide a single dewpoint value. This single dewpoint value may be calculated based on an average of the multiple relative humidity and/or temperature values measured.

The control circuitry 122 may determine a weight averaged relative humidity value using a weight average dewpoint value. The weight averaged dewpoint value may be determined using the following dewpoint average function that takes the weighted average of all available zone dewpoint values:

$$DewPoint_{Average} = \frac{\Sigma_{N \in Available}(DewPoint_{zone[N]} \cdot Priority_{Zone[N]})}{\Sigma_{N \in Available}(Priority_{Zone[N]})} \quad (E36)$$

The zone priority value is used in the above equation to provide the weighting, and this weighting gives better latent capacity control to zones with higher priority. In equation (E36), the weight averaged dewpoint value is represented as $DewPoint_{Average}$, and that value is determined based on the sum of dewpoint values for all available zones multiplied by the priority level for each zone, $\Sigma_{M \in Available}(DewPoint_{zone[N]} \cdot Priority_{Zone[N]})$, which is then divided by the sum of the priority values for all available zones, $\Sigma_{N \in Available}(Priority_{Zone[N]})$.

The control circuitry 122 may also determine a weight averaged temperature value. This weight averaged temperature value may be determined using the following equation:

$$Temperature_{Average} = \frac{\Sigma_{N \in Available}(Temperature_{zone[N]} \cdot Priority_{Zone[N]})}{\Sigma_{N \in Available}(Priority_{Zone[N]})} \quad (E37)$$

In equation (E37), the weight averaged temperature value is represented as $Temperature_{Average}$. That value is determined based on the sum of temperature values for all available zones multiplied by the priority level for each zone, $\Sigma_{N \in Available}(Temperature_{zone[N]} \cdot Priority_{Zone[N]})$. The resulting sum is then divided by the sum of the priority values for all available zones, $\Sigma_{N \in Available}(Priority_{Zone[N]})$.

The weight averaged relative humidity value may be determined by mapping the weight averaged dewpoint value and the weight averaged temperature value to determine the corresponding weight averaged relative humidity value. These weight averaged temperature and weight averaged dewpoint values can be mapped to a weight averaged relative humidity value using a Magnus approximation. In some instances, the weight averaged temperature and the weight averaged dewpoint value are mapped to a weight average relative humidity value, $RH_{Average}$, using the below equations:

$$TC = (Temperature_{Average} - 32) \times \frac{5}{9} \quad (E38)$$

$$TDEWC = (DewPoint_{Average} - 32) \times \frac{5}{9} \quad (E39)$$

$$PHI = \exp\left(\frac{17.625 * TDEWC}{243.04 + TDEWC} - \frac{17.625 * TC}{243.04 + TC}\right) \quad (E40)$$

$$RH_{Average} = PHI \times 100 \quad (E41)$$

In some examples, the control circuitry 122 determines a weight averaged temperature setpoint from the zone ambient temperature values, the zone temperature setpoints, and the zone priority levels. The control circuitry may receive the zone temperature setpoint, and the control circuitry may calculate an equivalent setpoint using the weighted average temperature value. For example, the weighted average temperature setpoint may be calculated as follows:

$$CoolingSetpoint_{average} = Temperature_{Average} - \frac{\Sigma_{N \in Cooling}(CoolingError_{zone[N]} \cdot Priority_{Zone[N]})}{\Sigma_{N \in Cooling}(Priority_{Zone[N]})} \quad (E42)$$

In some instances, the above weight averaged temperature setpoint is only calculated for the cooling mode, $CoolingSetpoint_{average}$. In equation (E42), this value is determined by subtracting the weight averaged temperature value by a weight averaged cooling error. This weight averaged cooling error is determined based on the sum of cooling error values for all available zones in the cooling mode multiplied by the priority level for that zone, $\Sigma_{N \in Cooling}(CoolingError_{zone[N]} \cdot Priority_{Zone[N]})$, which is then divided by the sum of the priority values for all available zones in the cooling mode, $\Sigma_{N \in Cooling}(Priority_{Zone[N]})$.

In some implementations, the control circuitry 122 uses the weight averaged temperature setpoint along with the weight averaged relative humidity value to determine a latent capacity demand for the HVAC system. This value may be used to adjust the total requested capacity, and/or other capacity calculations discussed above. In some examples, this value may be used to adjust the CFM per ton value used.

The control circuitry 122 may also calculate a heating temperature error, $HeatingError_{equivalent}$. This weight averaged heating temperature error may be calculated as follows:

$$HeatingError_{equivalent} = \frac{\Sigma_{N \in Heating}(HeatingError_{zone[N]} Priority_{Zone[N]})}{\Sigma_{N \in Heating}(Priority_{Zone[N]})} \quad (E43)$$

In equation (E43), the weight averaged heating temperature error value is determined based on the sum of heating error values for all available zones in the heating mode multiplied by the priority level for that zone, $\Sigma_{N \in Heating}(HeatingError_{zone[N]} \cdot Priority_{Zone[N]})$. This sum is then divided by the sum of the priority values for all available zones in the heating mode, $\Sigma_{N \in Heating}(Priority_{Zone[N]})$.

In some examples, the control circuitry 122 may switch or maintain the HVAC system 100 in an operating mode. For example, the control circuitry may switch or maintain the operating mode based on a switch mode error value and a switchover error limit. In these instances, the switch mode error value may be determined from a weight averaged heating mode error value and a weight averaged cooling mode error value.

The control circuitry 122 may determine a weight averaged heating mode error value and a weight averaged cooling mode error value for the zones in the heating mode and the cooling mode respectively. The weight averaged heating mode error value and the weight averaged cooling mode error value may be based on the zone ambient temperature values and the zone temperature setpoints.

Each zone in the HVAC system 100 may be allowed to independently request an operation mode. In some instances, the operation mode for each zone may be automatic determined based on system parameters such as the zone ambient temperature value and the zone temperature setpoint. In other instances, the operation mode for each zone may be based on user input. Regardless, in some examples, the requested zone operation mode may be different from the operating mode of the HVAC system, and/or the requested operating mode for a zone may be different than other zones with the same or different priority levels.

In order to determine whether the HVAC system should switch or maintain a given zone, the control circuitry 122 may determine a zone switch weight value, SwitchWeight, for each zone. This value may take into account the zone priority level for each zone, or in some instances, it may only take into account zones with priority values above the minimum value. In some examples, the zone switch weight value is calculated as follows:

$$SwitchWeight = \frac{(Priority - 1.0) \cdot (Priority \geq 1)}{\Sigma(Priority - 1.0) \cdot (Priority \geq 1)} \quad (E45)$$

In equation (E45), a zone switch weight value is determined for any zone with a medium (2) or a high (4) numerical value. In this equation, the priority value of a given medium or high zone is subtracted by 1, (Priority−1.0). (Priority≥1). That value is divided by the sum of all the priority values having a medium or high numerical priority level value where, again, the numerical priority level for each zone is subtracted by 1. In the above equation, this sum of all medium or high priority level values is represented as $\Sigma(Priority-1.0) \cdot (Priority \geq 1)$. Other methods may be used to determine the zone switch weight value, particularly if different numerical values are used for the zone priority levels.

The zone switch weight value may be then used to calculate the weight averaged heating mode error value, HeatModeError, for zones requesting heating and a weight averaged cooling mode error value, CoolModeError, for zones requesting cooling. The weight averaged heating mode error value may be calculated as follows:

$$HeatModeError = \Sigma_{Mode[N]=Heat}((SwitchWeight_{Zone[N]}) \\ (HeatingError_{Zone[N]})) \quad (E46)$$

The weight averaged cooling mode error value, CoolModeError, may be calculated as follows:

$$CoolModeError = \Sigma_{Mode[N]=Cool}((SwitchWeight_{Zone[N]}) \\ (CoolingError_{Zone[N]})) \quad (E47)$$

The control circuitry 122 may then determine a switch mode error value from the weight averaged heating mode error value and the weight averaged cooling mode error value. This switch mode error value, SwitchModeError, may be calculated as follows:

$$SwitchModeError = HeatModeError - CoolModeError \quad (E48)$$

The control circuitry 122 then may either switch or maintain the HVAC system 100 in the current operating mode based on the switch mode error value and a switchover error limit. For example, if the HVAC system is in cooling, the control circuitry may switch the HVAC system operating mode to the heating mode when the weight averaged heating mode error value is greater than the weight averaged cooling mode error, and the switch mode error value is greater than the switchover error limit. Similarly if the HVAC system is in heating, the control circuitry may switch the HVAC system operating mode to the cooling mode when the weight averaged cooling mode error value is greater than the weight averaged heating mode error, and the switch mode error value is greater than the switchover error limit.

The control circuitry 122 may also preform additional steps during this process for switching or maintaining the operating mode. For example, the control circuitry may first turn off the HVAC system 100 for a set period of time before switching the HVAC system between modes. The control circuitry may maintain the HVAC system in the current operating mode when the switch mode error value is less than the switchover error limit. In some instances, the control circuitry uses the below process to switch or maintain the operating mode of the HVAC system based on the switch mode error value and the switchover error limit:

```
If(SwitchModeError > SwitchoverError)
    NewModeRequest = Heating
end
If(SwitchModeError < −SwitchoverError)
    NewModeRequest = Cooling
end
If(NewModeRequest ≠ SystemMode)
    If(OffTime > SwitchMinOffTime)
        SystemMode = NewModeRequest
    else
        SystemMode = Off
    end
end
```

In some examples, the HVAC system 100 may include multiple stages of operation. Each stage of operation may have a minimum capacity and a maximum capacity. The control circuitry 122 may switch the HVAC system between the stages of operation and/or select the appropriate stage of operation. The control circuitry may select one of the multiple stages of the HVAC system to satisfy a total of the target zone capacity values. The control circuitry may use the target zone capacity values to determine the stage and type of equipment to use in order to satisfy the requested demand.

In this process, the capacity limits for each stage may be fed in as inputs to the control circuitry 122. Those capacity limits may be modified depending on operating mode and stage availability. In some instances, the control circuitry outputs a normalized capacity values for each stage that are mapped to a compressor speed, firing rate, or an electric heat demand externally.

The control circuitry 122 may define the capacity limit for the HVAC system 100 in normalized units. For example, the control circuitry may use the actual capacity limits in energy units (e.g., kBtu) divided by the nominal capacity of the same unit to determine the normalized capacity limit values.

The control circuitry 122 may determine the nominal capacity limits for the HVAC equipment 102 by first assuming that the installed unit matches the load for the installed location, e.g., the unit size for a house matches the load for the house. Often the installed unit is sized based on a load calculation for the conditioned space, and the nominal capacity for cooling may be sized for the maximum cooling load for that space at a given day and time during a calendar year. Similarly, the nominal capacity for heating may be sized based on the maximum anticipated heating load at a given day and time, potentially determined through load calculation analysis. In some examples, the size of the unit may be decreased to avoid excessive cycling, costs, or other considerations. In other examples, the size of the unit for heating and/or cooling may be adjusted to ensure the unit can handle the load for the given space through the various expected loads over the life of the unit, while also ensuring the unit is not oversized which may lead poor performance and/or excessive costs. Other methods for sizing a unit to match the installed location may also be used.

The control circuitry 122 may then use the nominal capacity values for the unit to determine a minimum capacity value and maximum capacity value for each mode of operation. The control circuitry may also determine a nominal minimum capacity value and a nominal maximum capacity value for each stage within each mode of operation. These nominal minimum capacity values and nominal maximum capacity values may be determined, in part, based on the installed HVAC equipment and the nominal capacity values. For example, a scale factor may be applied to the nominal capacity value to determine the minimum capacity value and the maximum capacity value. In these example, the scale factor for the maximum capacity could be a value greater than 1, e.g., 1½, 2, etc., and the maximum capacity could be determined by multiplying the nominal capacity by the scale factor value. Similarly, in these examples, the minimum capacity value could be a value less than 1, e.g., ½¾, etc., and the minimum capacity could be determined by multiplying the nominal capacity by the scale factor value. In some instances, the scale factor value may be based, in part, on the type of heating or cooling element used. For example, cooling coils that use refrigerant may have a different minimum and maximum scale factor value than those using hydronic coils. Similarly, electric heating elements may have different scale factor values than gas furnaces heating elements.

Where the HVAC equipment 102 includes multiple heating and/or cooling stages, the stage limits may also be calculated using the above described method and/or table for each stage. In these instances, the default nominal capacity value is the default nominal stage capacity value. That default nominal stage capacity value is used according to the above equations to determine the nominal minimum capacity value and nominal maximum capacity value for each stage.

In some examples, the above default nominal capacity values can be adjusted, potentially by the installer. In other examples, the nominal minimum and/or maximum capacity values may be inputted directly, and in some instances, an installer or user is the one who directly inputs these values. These adjustments may be done to improve comfort control, and they may be particularly applicable if there is an indication that the installed equipment is under or over sized. Typically, these nominal capacity values may only be adjusted or inputted within the equipment limits.

The control circuitry 122 may determine a normalized system (or stage) minimum and maximum capacity limit using these nominal values. For example, the control circuitry may assume that the normalized stage limits are to be calculated at the current ambient conditions for outdoor stages. As a result, the control circuitry may adjust the stage limits based on the current ambient conditions. In particular, if the installed outdoor unit has a cooling capacity of 60 kBtu at nominal conditions, and a cooling capacity of 66 kBtu at the current ambient conditions, the expected normalized capacity limit, CoolODMaxNCap, may become:

$$CoolODMaxNCap = \frac{66}{60} = 1.10 \quad \text{(E49)}$$

The control circuitry 122 may perform the above operation for all minimum and maximum stage limits, and adjust all the stage limits based on the expected normalized capacity limit. For multiple stage units, the capacity limits for these stages may be accumulated to determine the adjusted stage limits. For example, the nominal second cooling stage maximum capacity for an HVAC equipment 102 may be calculated as the sum of the current first cooling stage maximum capacity and the current second cooling stage maximum capacity. To determine the normalized second cooling stage maximum capacity, this sum is then divided by the nominal condition as set forth in equation (E49). This accumulation process may also be performed for any multi-stage HVAC equipment, e.g., multi-stage electric heating HVAC equipment, multi-stage furnace/hydronic heating HVAC equipment.

The control circuitry 122 may then match the normalized requested capacity value received to the appropriate stage or set of stages depending on the normalized limits of those stages and their availability. For example, for a set of available stages with maximum limits [$MaxNCap_1$, $MaxNCap_2$ ... $MaxNCap_n$] the control circuitry picks the stage or set of stages with the highest accumulative capacity limit at or below the requested capacity. In some examples, once a set of stages are selected by the control circuitry, the requested capacity is matched at the highest selected stage using a duty cycling if the stage has a fixed speed, or by continuously changing the stage demand output if the stage is modulating.

In some instances, the HVAC equipment 102, as installed, includes zone dampers 116 that adjust to regulate the air flow of conditioned air to each zone. In these instances, the control circuitry 122 may convert the target zone capacity values to target zone airflow values. For example, the normalize target zone capacity values may be converted to an airflow value for each zone. This airflow value, $Airflow_{Zone[N]}$, may be determined according to the following equation:

$$Airflow_{Zone[N]} = \qquad \text{(E50)}$$
$$NormCapacity_{Zone[N]} \times NominalAirflow \times \frac{CFMperTon}{NominalCFMperTon}$$

The control circuitry 122 may determine a damper position set from the target zone airflow values. The damper position set includes the damper position for each zone damper 116. In some instances, the control circuitry actuates the zone dampers to the respective damper positions for each zone 110.

In some examples, the control circuitry 122 applies the zone airflow target values to a duct model to determine the damper position. The control circuitry may determine an estimated maximum flow factor for each zone damper 116 in a fully-open position, where the duct model includes a first term that describes the flow factor. The control circuitry may also determine a maximum value for the branch pressure of a given zone using the zone airflow target values, the estimated maximums of the flow factor, and a second term of the duct mode. In these instances, the second term describes the zone branch pressure as a function of the zone airflow and the flow factor. The control circuitry may then determine the damper position using the estimates of the flow factor and the first term of the duct model restated to describe the damper position as a nonlinear function of the flow factor.

In some examples, the control circuitry may also determine a value of total airflow to achieve a total of the target zone airflow values with a total pressure target. In these instances, the control circuitry causes the fan to provide the conditioned air with the value of the total airflow.

The control circuitry may also receive an indication of the zone size values expressed as maximum zone airflow values for the zones with respective ones of the zone dampers in a fully-open position.

In some examples, the HVAC system 100 includes a defrost cycle, which in some instances, may operate the refrigerant circuit in the HVAC system in in a cooling mode while the outdoor conditions indicate the system should be operating in a heating mode. The defrost cycle may occur when ice builds up on the outdoor heat exchanger. This may occur when a heat pump is operating in heating mode and/or when the outdoor air temperature is sufficient low. In these instances, the HVAC system may operate the refrigerant loop in a cooling mode, which heats the refrigerant passing through the outdoor heat exchanger and thaws the ice. However, because defrost is typically required in circumstance where the outdoor temperature is low, the conditioned space is typically calling for heating relief or no relief. Thus, running the HVAC system in a cooling mode is often undesirable because it causes the indoor unit to provide cool air into a conditioned space. As a result, these systems may reheat the conditioned air supplied by the indoor unit to limit or reduce any cold air being supplied to a room requesting either heating relief or no relief.

Regardless, when the HVAC system is in a defrost cycle, the system may provide an excess air flow, and the control circuitry 122 may direct this excess air to various zones. For example, the control circuitry may direct the excess air into zones with lower priority. In these examples, the control circuitry may determine that a higher percentage of the total airflow should be distributed to zones having lower priority when the defrost cycle is running and the HVAC system is operating in a cooling mode. This airflow distribution may be based on airflow values determined from target zone capacity values.

To implement this airflow distribution, the control circuitry 122 may actuate the zone dampers to regulate the airflow of the conditioned air to various zones. Again, the control circuitry may actuate the zone dampers to provide less conditioned air to at least one zone having a higher priority when the system is in a defrost cycle and operating in a cooling mode.

The HVAC system 100 may use a defrost parameter, DefrostNCap, to assist in this process. This parameter may be used to help the system correlate the net heating or cooling of the system while the system is operating in the defrost mode. The defrost parameter value may be added to the total requested capacity value to offset any defrost cooling effect. The control circuitry 122 may use the resulting value to determine a defrost normalized capacity for the system. To walk through how this value may be used, in some examples, the defrost parameter may be set to a non-zero value under 1.0. A value of 1.0 in this example indicates that the average cooling capacity provided during a defrost call is equal to the unit nominal cooling capacity.

The control circuitry 122 may determine if electric heat stages are available to prevent a net cooling effect. In these examples, the defrost normalized capacity may be compared against the maximum electric heat normalized capacity to check for a net cooling result. If the highest available electric heat capacity is higher than the defrost parameter, DefrostNCap, the defrost may have a net heating effect. In some instances, the control circuitry may use this net heating effect as a new minimum capacity value, HDeFrMinNCap. In these instances, the control circuitry rescales the normalized capacity to this new minimum capacity value:

$$NormCapacity_{Zone[N]} = HDeFrMinNCap \times \frac{ReqCapacity_{Zone[N]}}{\Sigma(ReqCapacity_{Zone[N]})} \quad \text{(E51)}$$

If any zone has excess or available capacity, the redistribution of the capacity may be handled by any of the above described processes.

If the highest available electric heat capacity is lower than the defrost parameter, DefrostNCap, the defrost may have a net cooling effect. In these instances, the control circuitry 122 may switch the operating mode to cooling. The control circuitry uses the net cooling value to set a new minimum capacity for the system, CDeFrMinNCap. If the sum of zone sizes requesting cooling is higher than CDeFrMinNCap, the defrost capacity is distributed to those zones proportional to their size:

$$NormCapacity_{Zone[N]} = \\ CDeFrMinNCap \times \frac{Size_{Zone[N]} \times (ReqMode_{Zone[N]} = Cool)}{\Sigma(Size_{Zone[N]} \times (ReqMode_{Zone[N]} = Cool))} \quad (E52)$$

In some examples, if the sum of the zone sizes for zones calling for cooling is lower than the minimum capacity, the defrost capacity is distributed to zones proportional to their contribution to the defrost cost function and their requested mode is set to cooling. If the distributed net cooling defrost capacity is over the maximum allowed capacity for some zones, relief may be handled in any of the above described redistribution processes.

FIGS. 2A-2K are flowcharts illustrating various operations in a method 200 of controlling an HVAC system 100, according to some example implementations. Again, the HVAC system includes HVAC equipment 102 configured to provide conditioned air to a conditioned space that is divided into zones 110A, 110B, 110C. As shown at block 202 of FIG. 2A, the method includes receiving zone priority levels and zone temperature setpoints, where at least one of the zones has a higher priority level than another zones. The method 200 includes receiving an indication of zone ambient temperature values, as shown at block 204. The method also includes determining requested zone capacity values to maintain the zone ambient temperature within a threshold deviation of each zone's respective zone temperature setpoints, as shown at block 206.

Figure 2A:
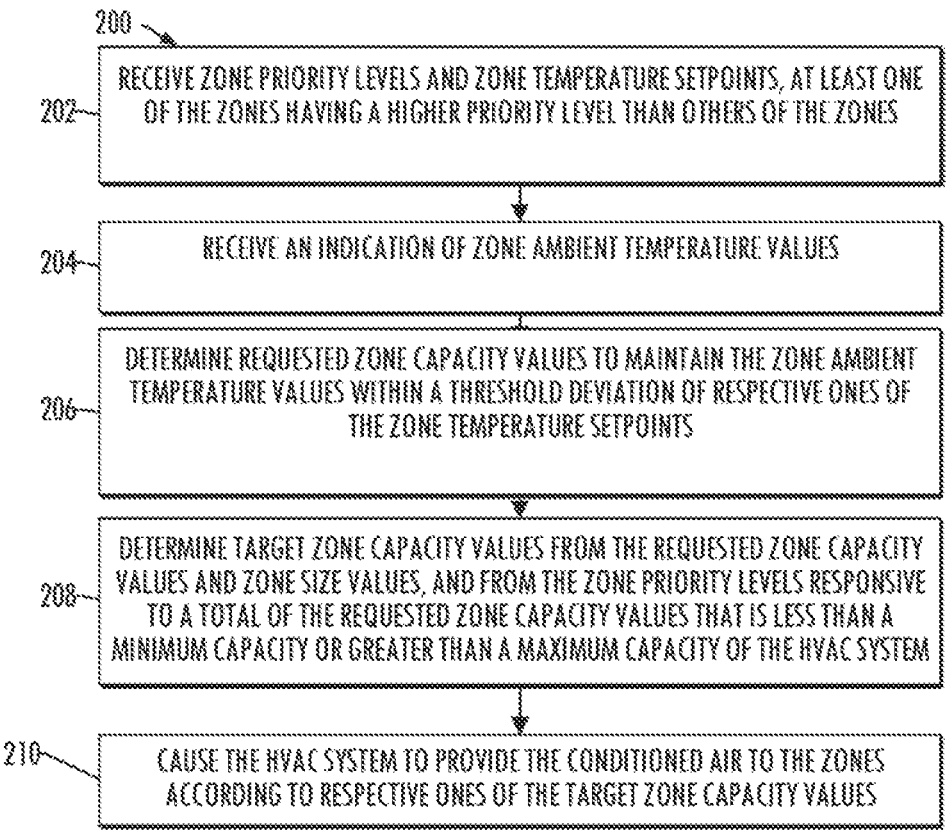

The method 200 may further includes determining target zone capacity values from the requested zone capacity values and zone size values, as shown at block 208 of FIG. 2A. In some examples, the method also includes determining target zone capacity values from the zone priority levels. In some examples, these target zone capacity values are responsive to a total of the requested zone capacity values being either less than a minimum capacity or greater than a maximum capacity of the HVAC system. The method further includes causing the HVAC system to provide the conditioned air to the zones based on the respective target zone capacity values for each zone, as shown at block 210.

Figure 2B:
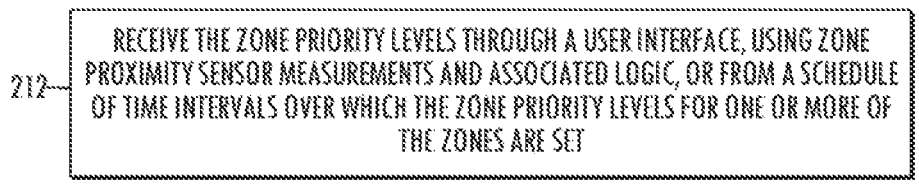

In some examples, the method 200 includes receiving the zone priority levels at block 202 through a user interface, as shown in in block 212 of FIG. 2B. These zone priority levels may be received using zone proximity sensor measurements and associated logic, and in some examples, these zone priority levels are received from a schedule of time intervals over which the zone priority levels for one or more of the zones are set.

In some examples, the target zone capacity values at block 208 are determined such that these values correspond to the requested zone capacity values scaled by the zone size values for each respective zone. In some examples, this scaling is in response to the total of the requested zone capacity values being between the minimum capacity and the maximum capacity.

Figure 2C:
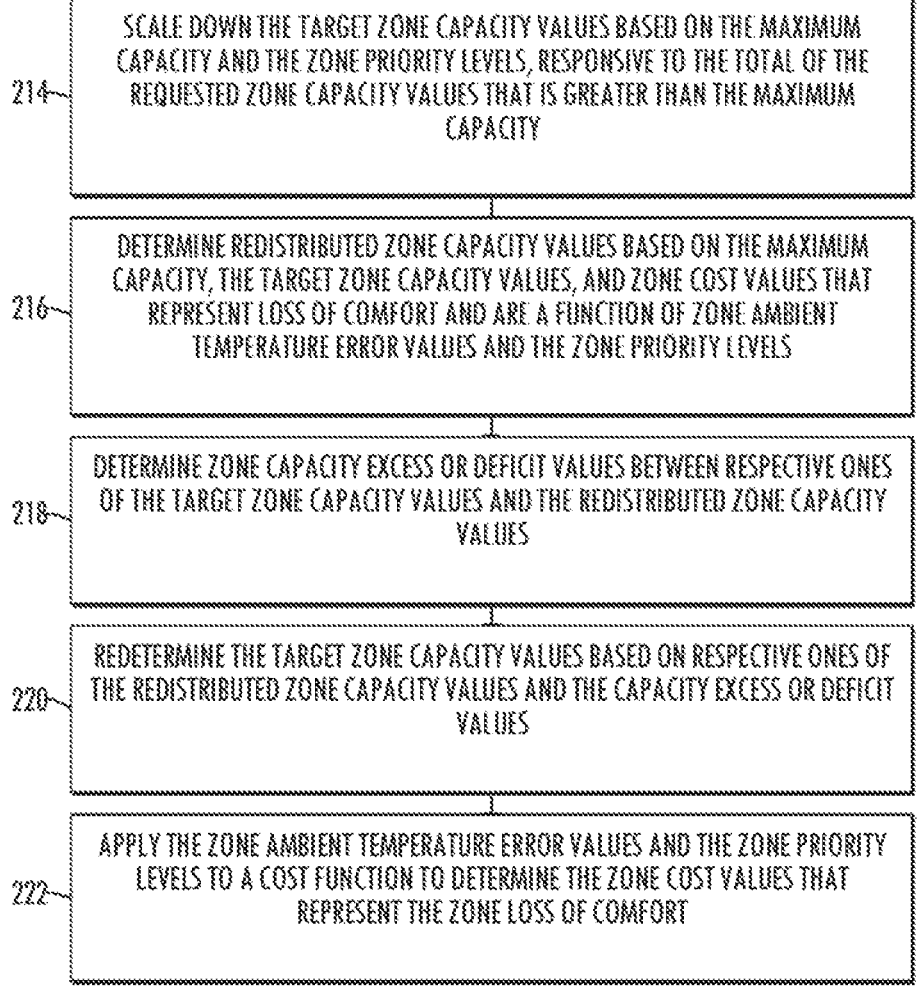

In some further examples, the method 200 includes scaling down the target zone capacity values based on the maximum capacity and the zone priority levels, as shown at block 214 of FIG. 2C. In some examples, this scaling down is in response to the total requested zone capacity value being greater than the maximum capacity of the HVAC system. In some examples, the target zone capacity values are scaled down, at least in part, by determining redistributed zone capacity values based on the maximum capacity, the target zone capacity values, and zone cost values, as shown in block 216. The zone cost values may represent the loss of comfort for a given zone, and in some examples, these values are a function of zone ambient temperature error values and the zone priority levels.

In some examples, the method 200 includes determining zone capacity excess or deficit values. In these examples, the capacity excess values are between the target zone capacity values and the redistributed zone capacity values, as shown at block 218 of FIG. 2C. The method may also include redetermining the target zone capacity values based on the redistributed zone capacity values and the capacity excess or deficit values, as shown at block 220. In these examples, the method may further include applying the zone ambient temperature error values and the zone priority levels to a cost function to determine the zone cost values. In addition, the zone ambient temperature error values may indicate a deviation of the zone ambient temperature values from the zone temperature setpoints, as shown at block 222.

Figure 2D:
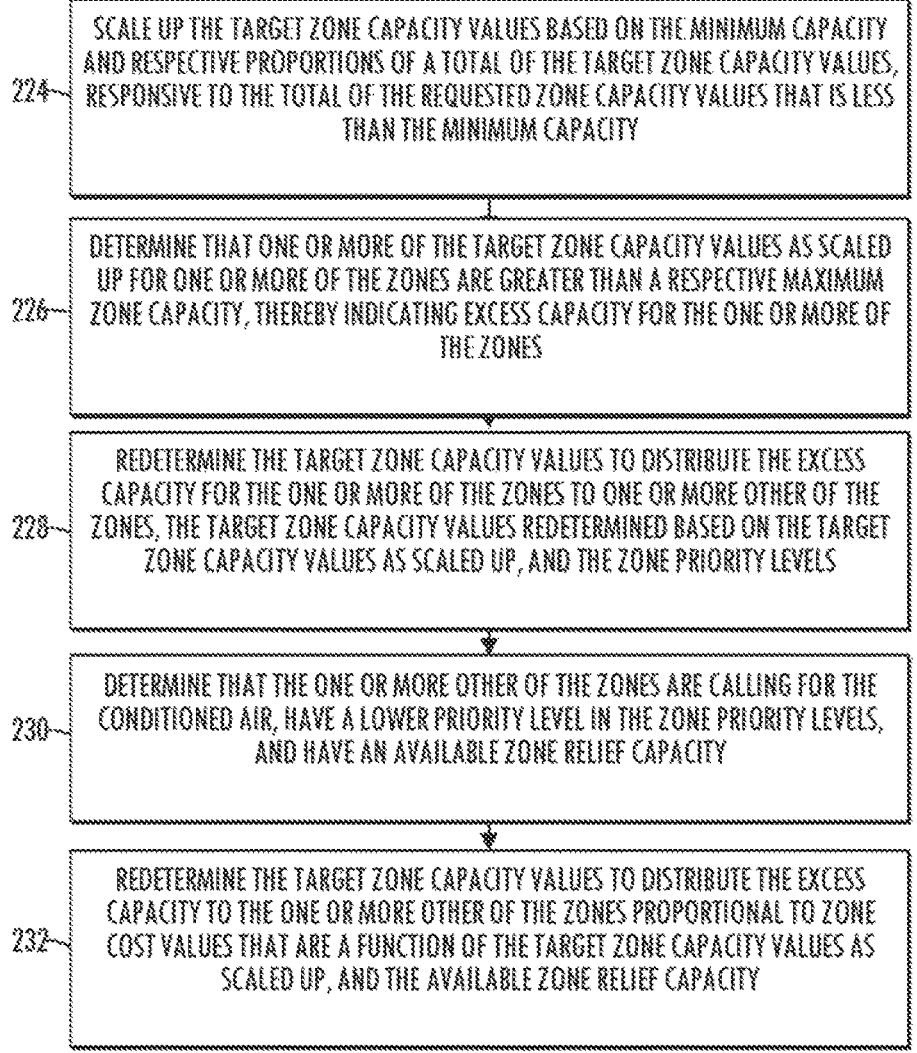

In some further examples, the method 200 scales up the target zone capacity values based on the minimum capacity and the respective proportions of a total of the target zone capacity values, as shown at block 224 in FIG. 2D. In these examples, this scaling up may be in response to the total of the requested zone capacity values being less than the minimum capacity. In these examples, the scaling up the target zone capacity values includes determining that one or more of the target zone capacity values as scaled up for one or more of the zones are greater than a respective maximum zone capacity, thereby indicating excess capacity exists for the one or more of the zones, as shown in block 226.

In these examples, the method 300 may include redetermining the target zone capacity values to distribute the excess capacity for the one or more of the zones to one or more other zone(s), as shown at block 228. In these examples, the target zone capacity values may be redetermined based on the target zone capacity values as scaled up and the zone priority levels. In these examples, the method may also determine that the one or more other of the zones calling for the conditioned air have a lower priority level and also have available zone relief capacity, as shown at block 230. In some examples, if that is determined at block 230, the method 200 may then redetermining the target zone capacity values to distribute the excess capacity to the one or more other of the zones proportional to zone cost values, as shown in block 232. These zone cost values may be a function of the target zone capacity values as scaled up, and the available zone relief capacity.

Figure 2E:
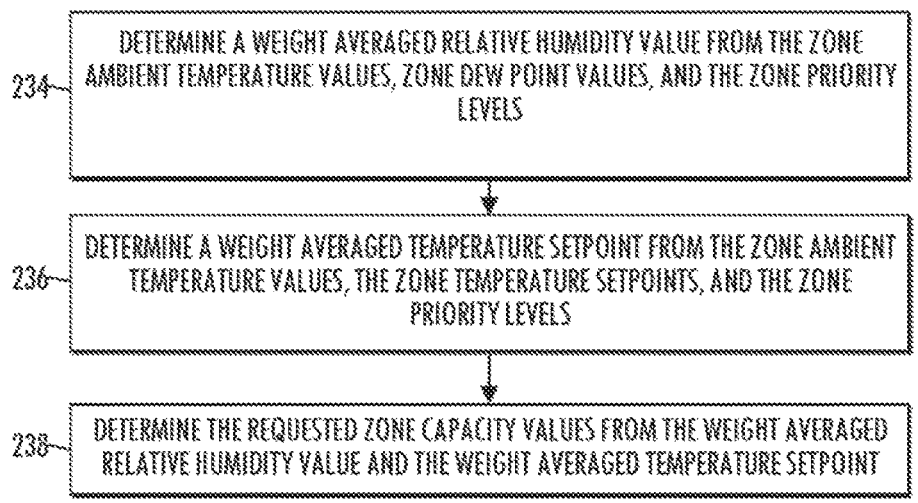
Figure 2F:
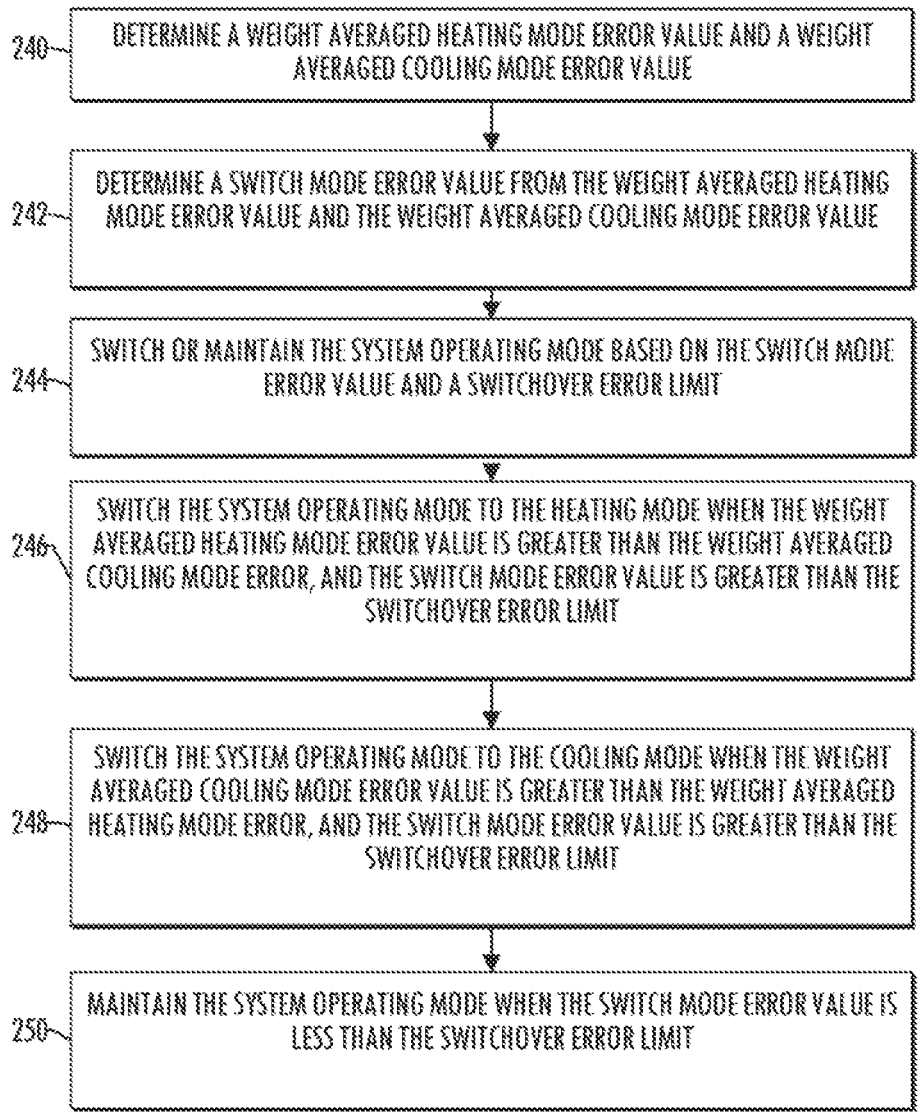
Figure 2G:
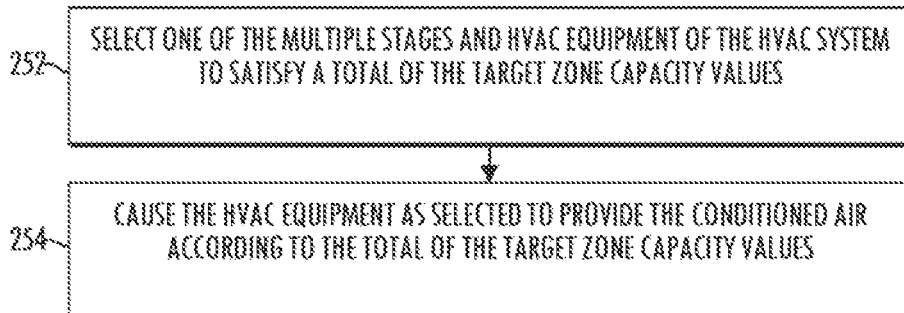
Figure 2H:
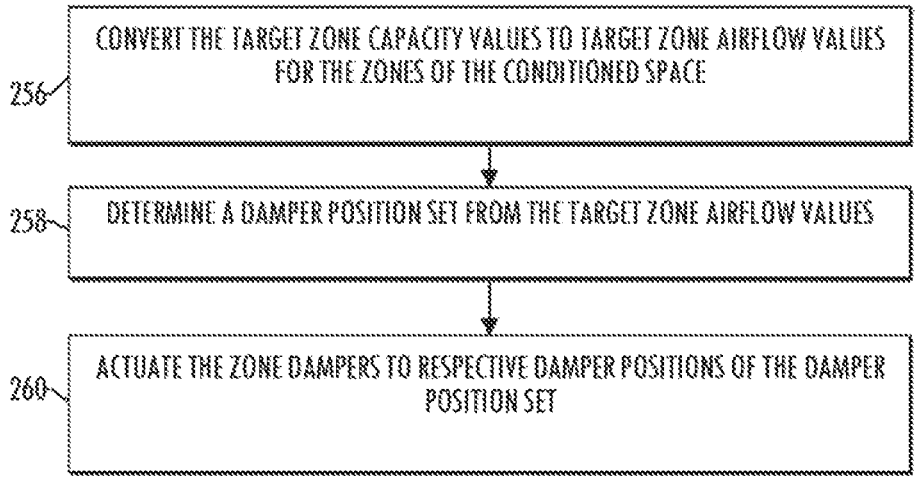
Figure 2I:
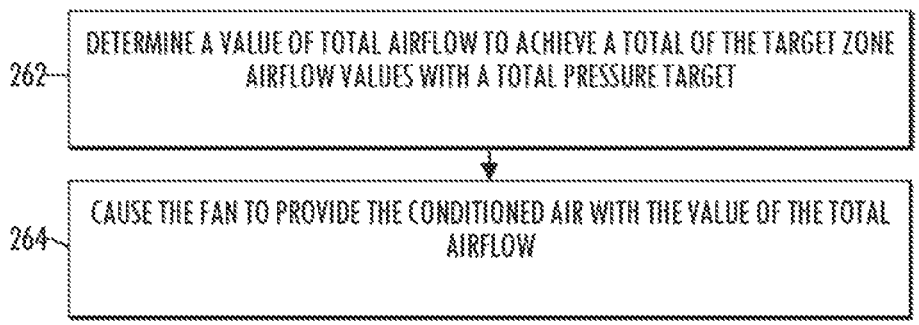

In some further examples, the method 200 includes determining a weight averaged relative humidity value from the zone ambient temperature values, zone dew point values, and the zone priority levels as shown at block 234 in FIG. 2E. The method includes determining a weight averaged temperature setpoint from the zone ambient temperature values, the zone temperature setpoints, and the zone priority levels, as shown in block 236. In some of these examples, the requested zone capacity values are determined from the weight averaged relative humidity value and the weight averaged temperature setpoint, as shown at block 238.

In some examples, the HVAC system 100 has a system operating mode and zone operating modes each of which is selectable between modes including a heating mode and a cooling mode. In some of these examples, the method 200 further includes determining a weight averaged heating mode error value and a weight averaged cooling mode error value for those of the zones in respectively the heating mode and the cooling mode, where these error values are based on the zone ambient temperature values and the zone temperature setpoints, as shown at block 240 in FIG. 2F. This method may also include determining a switch mode error value from the weight averaged heating mode error value and the weight averaged cooling mode error value, as shown at block 242. This method may include switching or maintaining the system operating mode based on the switch mode error value and a switchover error limit, as shown at block 244.

In some of these examples, the method 200 may include switching the system operating mode to the heating mode when the weight averaged heating mode error value is greater than the weight averaged cooling mode error and the switch mode error value is greater than the switchover error limit, as shown at block 246. Similarly, in some of these examples, the method may include switching the system operating mode to the cooling mode when the weight averaged cooling mode error value is greater than the weight averaged heating mode error, as shown at block 248. In some examples, the method includes maintaining the system operating mode when the switch mode error value is less than the switchover error limit, as shown at block 250.

In some examples, the HVAC system 100 has multiple stages of operation. In some of these examples, the minimum capacity and the maximum capacity relate to the minimum and maximum capacity for the current stage in the multiple stage HVAC system. In some of these examples, the method 200 further comprises selecting one of the multiple stages to satisfy a total of the target zone capacity values, as shown at block 252 in FIG. 2G. The method may further cause the HVAC system to provide the conditioned air according to the total of the target zone capacity values, as shown at block 254.

In some examples, the HVAC equipment 102 is set up in an installation with zone dampers 116 controllable to regulate airflow of the conditioned air to respective ones of the zones 110. In some of these examples, the method 200 may further cause the HVAC system 100 to convert the target zone capacity values to target zone airflow values for the zones of the conditioned space, as shown at block 256 in FIG. 2H. In this example, the method may include determining a damper position set from the target zone airflow values, as shown at block 258. The method may further include actuating the zone dampers to respective damper positions of the damper position set, as shown at block 260.

In some examples, the HVAC system 100 includes a fan 104 configured to provide the conditioned air. In some of these examples, the method 200 determine a value of total airflow to achieve a total of the target zone airflow values with a total pressure target, as shown at block 262 in FIG. 2I. In some of these examples, the method may cause the fan to provide the conditioned air with the value of the total airflow, as shown at block 264.

In some examples, the method further includes receiving an indication of the zone size values expressed as maximum zone airflow values for the zones with respective ones of the zone dampers in a fully-open position, as shown at block 266 in FIG. 2J.

In some examples, the HVAC system 100 includes a defrost cycle. In some examples, the HVAC system operates in a cooling mode while in the defrost cycle. In these examples, the HVAC system may have excess capacity. In some of these examples, the HVAC system provides less of the conditioned air to at least one of the zones having a higher priority, as shown at block 268 in FIG. 2K.

In some examples, the HVAC equipment 102 is set up in an installation with zone dampers 116. In some of these examples, the method 200 may include actuating these zone dampers to regulate airflow of the conditioned air to respective ones of the zones, as shown at block 270 in FIG. 2K. In some examples, this also includes actuating the zone dampers to provide less of the conditioned air to the at least one of the zones having the higher priority during the defrost cycle, as shown at block 272.

In some examples, the control circuitry 122 receive zone priority levels and zone temperature setpoints for the zones. The control circuitry may also receive an indication of zone ambient temperature values. The control circuitry may further determine the requested load for each zone and/or the entire system. The control circuitry may determine if the total requested load is less than the minimum capacity of the HVAC system 100. In these examples, the control circuitry may maintain the HVAC system operating and provide any excess capacity to zones having lower priority. If the excess capacity provide to one or more zones is greater than the capacity that zone can receive, the control circuitry redistributes the load further.

According to example implementations of the present disclosure, the control circuitry 122 may be implemented by various means. Means for implementing the control circuitry may include hardware, alone or under direction of one or more computer programs from a computer-readable storage medium. In some examples, the control circuitry is formed of one or more circuit boards. The control circuitry may be centrally located or distributed throughout the HVAC system 100. For example, the control circuitry may be formed of distinct circuit boards including a circuit board positioned in the thermostat 126, and one or more circuit boards positioned at or within the HVAC equipment 102 (e.g., at the fan 104 configured to circulate or otherwise provide the conditioned air to the conditioned space 110).

Figure 3:
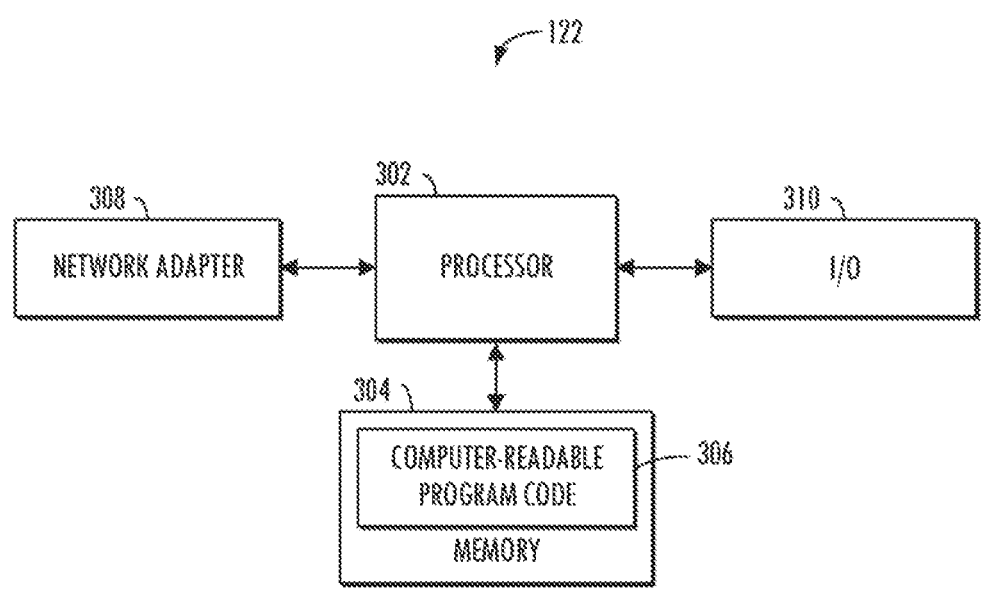
FIG. 3 illustrates control circuitry according to some example implementations.

FIG. 3 illustrates the control circuitry 122 according to some example implementations of the present disclosure. The control circuitry may include one or more of each of a number of components such as, for example, a processor 302 connected to a memory 304. The processor is generally any piece of computer hardware capable of processing information such as, for example, data, computer programs and/or other suitable electronic information. The processor includes one or more electronic circuits some of which may be packaged as an integrated circuit or multiple interconnected integrated circuits (an integrated circuit at times more commonly referred to as a "chip"). The processor 302 may be a number of processors, a multi-core processor or some other type of processor, depending on the particular implementation.

The processor 302 may be configured to execute computer programs such as computer-readable program code 306, which may be stored onboard the processor or otherwise stored in the memory 304. In some examples, the processor may be embodied as or otherwise include one or more ASICs, FPGAs or the like. Thus, although the processor may be capable of executing a computer program to perform one or more functions, the processor of various examples may be capable of performing one or more functions without the aid of a computer program.

The memory 304 is generally any piece of computer hardware capable of storing information such as, for example, data, computer-readable program code 306 or other computer programs, and/or other suitable information either on a temporary basis and/or a permanent basis. The memory may include volatile memory such as random access memory (RAM), and/or non-volatile memory such as a hard drive, flash memory or the like. In various instances, the memory may be referred to as a computer-readable storage medium, which is a non-transitory device capable of storing information. In some examples, then, the computer-readable storage medium is non-transitory and has computer-readable program code stored therein that, in response to execution by the processor 302, causes the control circuitry 122 to perform various operations as described herein, some of which may in turn cause the HVAC system 100 to perform various operations.

In addition to the memory 304, the processor 302 may also be connected to one or more peripherals such as a network adapter 308, one or more input/output (I/O) devices 310 or the like. The network adapter is a hardware component configured to connect the control circuitry 122 to a computer network to enable the control circuitry to transmit and/or receive information via the computer network. The I/O devices may include one or more input devices capable of receiving data or instructions for the control circuitry, and/or one or more output devices capable of providing an output from the control circuitry. Examples of suitable input devices include a keyboard, keypad or the like, and examples of suitable output devices include a display device such as a one or more light-emitting diodes (LEDs), a LED display, a liquid crystal display (LCD), or the like.

As explained above and reiterated below, the present disclosure includes, without limitation, the following example implementations.

Clause 1. A heating, ventilation, and air conditioning (HVAC) system comprising: HVAC equipment configured to provide conditioned air to a conditioned space that is divided into zones; and control circuitry operably coupled to the HVAC equipment and configured to at least: receive zone priority levels and zone temperature setpoints, at least one of the zones having a higher priority level than others of the zones; receive an indication of zone ambient temperature values; determine requested zone capacity values to maintain the zone ambient temperature values within a threshold deviation of respective ones of the zone temperature setpoints; determine target zone capacity values from the requested zone capacity values and zone size values, and from the zone priority levels responsive to a total of the requested zone capacity values that is less than a minimum capacity or greater than a maximum capacity of the HVAC system; and cause the HVAC system to provide the conditioned air to the zones according to respective ones of the target zone capacity values.

Clause 2. The HVAC system of clause 1, wherein the control circuitry is configured to receive the zone priority levels through a user interface, using zone proximity sensor measurements and associated logic, or from a schedule of time intervals over which the zone priority levels for one or more of the zones are set.

Clause 3. The HVAC system of clause 1 or clause 2, wherein the control circuitry is configured to determine the target zone capacity values to correspond to the requested zone capacity values scaled by respective ones of the zone size values, responsive to the total of the requested zone capacity values between the minimum capacity and the maximum capacity.

Clause 4. The HVAC system of any of clauses 1 to 3, wherein the control circuitry configured to determine the target zone capacity values includes the control circuitry configured to scale down the target zone capacity values based on the maximum capacity and the zone priority levels, responsive to the total of the requested zone capacity values that is greater than the maximum capacity.

Clause 5. The HVAC system of clause 4, wherein the control circuitry configured to scale down the target zone capacity values includes the control circuitry configured to at least: determine redistributed zone capacity values based on the maximum capacity, the target zone capacity values, and zone cost values that represent loss of comfort and are a function of zone ambient temperature error values and the zone priority levels; determine zone capacity excess or deficit values between respective ones of the target zone capacity values and the redistributed zone capacity values; and redetermine the target zone capacity values based on respective ones of the redistributed zone capacity values and the capacity excess or deficit values.

Clause 6. The HVAC system of clause 5, wherein the control circuitry is further configured to at least: apply the zone ambient temperature error values and the zone priority levels to a cost function to determine the zone cost values that represent the zone loss of comfort, the zone ambient temperature error values indicating deviation of the zone ambient temperature values from respective ones of the zone temperature setpoints.

Clause 7. The HVAC system of any of clauses 1 to 6, wherein the control circuitry configured to determine the target zone capacity values includes the control circuitry configured to scale up the target zone capacity values based on the minimum capacity and respective proportions of a total of the target zone capacity values, responsive to the total of the requested zone capacity values that is less than the minimum capacity.

Clause 8. The HVAC system of clause 7, wherein the control circuitry configured to determine the target zone capacity values further includes the control circuitry configured to at least: determine that one or more of the target zone capacity values as scaled up for one or more of the zones are greater than a respective maximum zone capacity, thereby indicating excess capacity for the one or more of the zones; and redetermine the target zone capacity values to distribute the excess capacity for the one or more of the zones to one or more other of the zones, the target zone capacity values redetermined based on the target zone capacity values as scaled up, and the zone priority levels.

Clause 9. The HVAC system of clause 8, wherein the control circuitry configured to redetermine the target zone capacity values includes the control circuitry configured to at least: determine that the one or more other of the zones are calling for the conditioned air, have a lower priority level in the zone priority levels, and have an available zone relief capacity; and redetermine the target zone capacity values to distribute the excess capacity to the one or more other of the zones proportional to zone cost values that are a function of the target zone capacity values as scaled up, and the available zone relief capacity.

Clause 10. The HVAC system of any of clauses 1 to 9, wherein the control circuitry configured to determine the requested zone capacity values includes the control circuitry configured to at least: determine a weight averaged relative humidity value from the zone ambient temperature values, zone dew point values, and the zone priority levels; and determine a weight averaged temperature setpoint from the zone ambient temperature values, the zone temperature setpoints, and the zone priority levels, wherein the control circuitry is configured to determine the requested zone capacity values from the weight averaged relative humidity value and the weight averaged temperature setpoint.

Clause 11. The HVAC system of any of clauses 1 to 10, wherein the HVAC system has a system operating mode and zone operating modes each of which is selectable between modes including a heating mode and a cooling mode, and the control circuitry is further configured to at least: determine a weight averaged heating mode error value and a weight averaged cooling mode error value for those of the zones in respectively the heating mode and the cooling mode, based on the zone ambient temperature values and the zone temperature setpoints; determine a switch mode error value from the weight averaged heating mode error value and the weight averaged cooling mode error value; and switch or maintain the system operating mode based on the switch mode error value and a switchover error limit.

Clause 12. The HVAC system of clause 11, wherein the control circuitry configured to switch or maintain the system operating mode includes the control circuitry configured to at least: switch the system operating mode to the heating mode when the weight averaged heating mode error value is greater than the weight averaged cooling mode error, and the switch mode error value is greater than the switchover error limit; switch the system operating mode to the cooling mode when the weight averaged cooling mode error value is greater than the weight averaged heating mode error, and the switch mode error value is greater than the switchover error limit; and maintain the system operating mode when the switch mode error value is less than the switchover error limit.

Clause 13. The HVAC system of any of clauses 1 to 12, wherein the HVAC system has multiple stages of operation, and the minimum capacity and the maximum capacity are for a current one of the multiple stages, and wherein the control circuitry is further configured to select one of the multiple stages and HVAC equipment of the HVAC system to satisfy a total of the target zone capacity values, and the control circuitry configured to cause the HVAC system to provide the conditioned air includes the control circuitry configured to cause the HVAC equipment as selected to provide the conditioned air according to the total of the target zone capacity values.

Clause 14. The HVAC system of any of clauses 1 to 13, wherein the HVAC equipment is set up in an installation with zone dampers controllable to regulate airflow of the conditioned air to respective ones of the zones, and the control circuitry configured to cause the HVAC system to provide the conditioned air includes the control circuitry configured to at least: convert the target zone capacity values to target zone airflow values for the zones of the conditioned space; determine a damper position set from the target zone airflow values; and actuate the zone dampers to respective damper positions of the damper position set.

Clause 15. The HVAC system of clause 14, wherein the HVAC system includes a fan configured to provide the conditioned air, and the control circuitry configured to cause the HVAC system to provide the conditioned air further includes the control circuitry configured to at least: determine a value of total airflow to achieve a total of the target zone airflow values with a total pressure target; and cause the fan to provide the conditioned air with the value of the total airflow.

Clause 16. The HVAC system of clause 14 or clause 15, wherein the control circuitry is further configured to receive an indication of the zone size values expressed as maximum zone airflow values for the zones with respective ones of the zone dampers in a fully-open position.

Clause 17. The HVAC system of any of clauses 1 to 16, wherein the HVAC system includes a defrost cycle during which the HVAC system is caused to operate in a cooling mode, and provide less of the conditioned air to the at least one of the zones having the higher priority.

Clause 18. The HVAC system of clause 17, wherein the HVAC equipment is set up in an installation with zone dampers, and the control circuitry configured to cause the HVAC system to provide the conditioned air includes the control circuitry configured to at least: actuate the zone dampers to regulate airflow of the conditioned air to respective ones of the zones, including the control circuitry configured to actuate the zone dampers to provide less of the conditioned air to the at least one of the zones having the higher priority during the defrost cycle.

Clause 19. A method of controlling a heating, ventilation, and air conditioning (HVAC) system that includes HVAC equipment configured to provide conditioned air to a conditioned space that is divided into zones, the method comprising: receiving zone priority levels and zone temperature setpoints, at least one of the zones having a higher priority level than others of the zones; receiving an indication of zone ambient temperature values; determining requested zone capacity values to maintain the zone ambient temperature values within a threshold deviation of respective ones of the zone temperature setpoints; determining target zone capacity values from the requested zone capacity values and zone size values, and from the zone priority levels responsive to a total of the requested zone capacity values that is less than a minimum capacity or greater than a maximum capacity of the HVAC system; and causing the HVAC system to provide the conditioned air to the zones according to respective ones of the target zone capacity values.

Clause 20. The method of clause 19, wherein the zone priority levels are received through a user interface, using zone proximity sensor measurements and associated logic, or from a schedule of time intervals over which the zone priority levels for one or more of the zones are set.

Clause 21. The method of clause 19 or clause 20, wherein the target zone capacity values are determined to correspond to the requested zone capacity values scaled by respective ones of the zone size values, responsive to the total of the requested zone capacity values between the minimum capacity and the maximum capacity.

Clause 22. The method of any of clauses 19 to 21, wherein determining the target zone capacity values includes scaling down the target zone capacity values based on the maximum capacity and the zone priority levels, responsive to the total of the requested zone capacity values that is greater than the maximum capacity.

Clause 23. The method of clause 22, wherein scaling down the target zone capacity values includes: determining redistributed zone capacity values based on the maximum capacity, the target zone capacity values, and zone cost values that represent loss of comfort and are a function of zone ambient temperature error values and the zone priority levels; determining zone capacity excess or deficit values between respective ones of the target zone capacity values and the redistributed zone capacity values; and redetermining the target zone capacity values based on respective ones of the redistributed zone capacity values and the capacity excess or deficit values.

Clause 24. The method of clause 23 further comprising applying the zone ambient temperature error values and the zone priority levels to a cost function to determine the zone cost values that represent the zone loss of comfort, the zone ambient temperature error values indicating deviation of the zone ambient temperature values from respective ones of the zone temperature setpoints.

Clause 25. The method of any of clauses 19 to 24, wherein determining the target zone capacity values includes scaling up the target zone capacity values based on the minimum capacity and respective proportions of a total of the target zone capacity values, responsive to the total of the requested zone capacity values that is less than the minimum capacity.

Clause 26. The method of clause 25, wherein determining the target zone capacity values further includes: determining that one or more of the target zone capacity values as scaled up for one or more of the zones are greater than a respective maximum zone capacity, thereby indicating excess capacity for the one or more of the zones; and redetermining the target zone capacity values to distribute the excess capacity for the one or more of the zones to one or more other of the zones, the target zone capacity values redetermined based on the target zone capacity values as scaled up, and the zone priority levels.

Clause 27. The method of clause 26, wherein redetermining the target zone capacity values includes: determining that the one or more other of the zones are calling for the conditioned air, have a lower priority level in the zone priority levels, and have an available zone relief capacity; and redetermining the target zone capacity values to distribute the excess capacity to the one or more of the zones proportional to zone cost values that are a function of the target zone capacity values as scaled up, and the available zone relief capacity.

Clause 28. The method of any of clauses 19 to 27, wherein determining the requested zone capacity values includes: determining a weight averaged relative humidity value from the zone ambient temperature values, zone dew point values, and the zone priority levels; and determining a weight averaged temperature setpoint from the zone ambient temperature values, the zone temperature setpoints, and the zone priority levels, wherein the requested zone capacity values are determined from the weight averaged relative humidity value and the weight averaged temperature setpoint.

Clause 29. The method of any of clauses 19 to 28, wherein the HVAC system has a system operating mode and zone operating modes each of which is selectable between modes including a heating mode and a cooling mode, and the method further comprises: determining a weight averaged heating mode error value and a weight averaged cooling mode error value for those of the zones in respectively the heating mode and the cooling mode, based on the zone ambient temperature values and the zone temperature setpoints; determining a switch mode error value from the weight averaged heating mode error value and the weight averaged cooling mode error value; and switching or maintaining the system operating mode based on the switch mode error value and a switchover error limit.

Clause 30. The method of clause 29, wherein switching or maintaining the system operating mode includes: switching the system operating mode to the heating mode when the weight averaged heating mode error value is greater than the weight averaged cooling mode error, and the switch mode error value is greater than the switchover error limit; switching the system operating mode to the cooling mode when the weight averaged cooling mode error value is greater than the weight averaged heating mode error, and the switch mode error value is greater than the switchover error limit; and maintaining the system operating mode when the switch mode error value is less than the switchover error limit.

Clause 31. The method of any of clauses 19 to 30, wherein the HVAC system has multiple stages of operation, and the minimum capacity and the maximum capacity are for a current one of the multiple stages, and wherein the method further comprises selecting one of the multiple stages and HVAC equipment of the HVAC system to satisfy a total of the target zone capacity values, and causing the HVAC system to provide the conditioned air includes causing the HVAC equipment as selected to provide the conditioned air according to the total of the target zone capacity values.

Clause 32. The method of any of clauses 19 to 31, wherein the HVAC equipment is set up in an installation with zone dampers controllable to regulate airflow of the conditioned air to respective ones of the zones, and causing the HVAC system to provide the conditioned air includes: converting the target zone capacity values to target zone airflow values for the zones of the conditioned space; determining a damper position set from the target zone airflow values; and actuating the zone dampers to respective damper positions of the damper position set.

Clause 33. The method of clause 32, wherein the HVAC system includes a fan configured to provide the conditioned air, and causing the HVAC system to provide the conditioned air further includes: determining a value of total airflow to achieve a total of the target zone airflow values with a total pressure target; and causing the fan to provide the conditioned air with the value of the total airflow.

Clause 34. The method of clause 32 or clause 33 further comprising receiving an indication of the zone size values expressed as maximum zone airflow values for the zones with respective ones of the zone dampers in a fully-open position.

Clause 35. The method of any of clauses 19 to 34, wherein the HVAC system includes a defrost cycle during which the HVAC system is caused to operate in a cooling mode, and provide less of the conditioned air to the at least one of the zones having the higher priority.

Clause 36. The method of clause 35, wherein the HVAC equipment is set up in an installation with zone dampers, and causing the HVAC system to provide the conditioned air includes actuating the zone dampers to regulate airflow of the conditioned air to respective ones of the zones, including actuating the zone dampers to provide less of the conditioned air to the at least one of the zones having the higher priority during the defrost cycle.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A heating, ventilation, and air conditioning (HVAC) system comprising:
   HVAC equipment configured to provide conditioned air to a conditioned space that is divided into zones, wherein the HVAC equipment includes a fan configured to provide the conditioned air; and
   control circuitry operably coupled to the HVAC equipment and configured to at least:

receive zone priority levels and zone temperature setpoints, at least one of the zones having a higher priority level than others of the zones;

receive an indication of zone ambient temperature values;

determine requested zone capacity values to maintain each of the zone ambient temperature values within a respective threshold deviation;

determine target zone capacity values from the requested zone capacity values and zone size values, and from the zone priority levels responsive to a total of the requested zone capacity values that is less than a minimum capacity of the HVAC system or greater than a maximum capacity of the HVAC system, wherein determining the target zone capacity values includes determining the target zone capacity values to correspond to the requested zone capacity values scaled by respective ones of the zone size values, responsive to the total of the requested zone capacity values between the minimum capacity and the maximum capacity;

operate the fan of the HVAC system to provide the conditioned air to the zones according to respective ones of the target zone capacity values.

2. The HVAC system of claim 1, wherein the HVAC equipment is set up in an installation with zone dampers controllable to regulate airflow of the conditioned air to respective ones of the zones; and wherein the control circuitry is further configured to:
convert the target zone capacity values to target zone airflow values for the zones of the conditioned space;
determine a damper position set from the target zone airflow values; and wherein the control circuitry is further configured to actuate the zone dampers to respective damper positions of the damper position set.

3. The HVAC system of claim 1, wherein the HVAC system has a system operating mode and zone operating modes each of which is selectable between modes including a heating mode and a cooling mode, and wherein the control circuitry is further configured to at least:
determine a heating mode error value and a cooling mode error value for those of the zones in respectively the heating mode and the cooling mode, based on the zone ambient temperature values and the zone temperature setpoints;
determine a switch mode error value from the heating mode error value and the cooling mode error value; and
switch or maintain the system operating mode based on the switch mode error value and a switchover error limit.

4. The HVAC system of claim 3, wherein the control circuitry configured to switch or maintain the system operating mode is further configured to initiate a minimum off time before switching the system operating modes.

5. The HVAC system of claim 1, wherein the control circuitry is further configured to receive the zone priority levels through a user interface, the zone priority levels being a numerical value applied through the user interface.

6. The HVAC system of claim 1, wherein the control circuitry is further configured to receive the zone priority level from a schedule of time intervals over which the zone priority levels for one or more of the zones are set, the schedule providing a zone with a higher priority during a first time interval when the zone is likely to be occupied and a lower priority during a second time interval when the zone is likely to be occupied.

7. The HVAC system of claim 1, wherein the control circuitry configured to determine the requested zone capacity values includes control circuitry further configured to determine the requested zone capacity values based on zone humidity values.

8. The HVAC system of claim 7, wherein the zone humidity values are zone dew point values, and wherein the control circuitry configured to determine the requested zone capacity values includes the control circuitry configured to at least:
determine a weighted average relative humidity value from the zone ambient temperature values, the zone dew point values, and the zone priority levels;
determine a weighted average temperature setpoint from the zone ambient temperature values, the zone temperature setpoints, and the zone priority levels; and
wherein the requested zone capacity values are determined based on, in part, the weighted average relative humidity value and the weighted average temperature setpoint.

9. The HVAC system of claim 1, wherein the control circuitry configured to determine the target zone capacity values includes the control circuitry configured to scale down the target zone capacity values based on the maximum capacity and the zone priority levels, responsive to the total of the requested zone capacity values that is greater than the maximum capacity; and wherein the control circuitry configured to scale down the target zone capacity values includes the control circuitry configured to at least:
determine redistributed zone capacity values based on the maximum capacity, the target zone capacity values, and zone cost values that represent loss of comfort and are a function of zone ambient temperature error values and the zone priority levels;
determine zone capacity excess or deficit values between respective ones of the target zone capacity values and the redistributed zone capacity values; and
redetermine the target zone capacity values based on respective ones of the redistributed zone capacity values and the zone capacity excess or deficit values.

10. The HVAC system of claim 1, wherein the control circuitry configured to determine the target zone capacity values includes the control circuitry configured to scale up the target zone capacity values based on the minimum capacity and respective proportions of a total of the target zone capacity values, responsive to the total of the requested zone capacity values that is less than the minimum capacity; and wherein the control circuitry configured to determine the target zone capacity values further includes the control circuitry configured to at least:
determine that one or more of the target zone capacity values as scaled up for one or more of the zones are greater than a respective maximum zone capacity, thereby indicating excess capacity for the one or more of the zones; and
redetermine the target zone capacity values to distribute the excess capacity for the one or more of the zones to one or more other of the zones, the target zone capacity values redetermined based on the target zone capacity values as scaled up, and the zone priority levels.

11. A method of controlling a heating, ventilation, and air conditioning (HVAC) system that includes HVAC equipment configured to provide conditioned air to a conditioned space that is divided into zones, wherein the HVAC equipment includes a fan configured to provide the conditioned air, the method comprising:
receiving zone priority levels and zone temperature setpoints, at least one of the zones having a higher priority level than others of the zones;
receiving an indication of zone ambient temperature values;
determining requested zone capacity values to maintain the zone ambient temperature values within a respective threshold deviation;
determining target zone capacity values from the requested zone capacity values and zone size values, and from the zone priority levels responsive to a total of the requested zone capacity values that is less than a minimum capacity of the HVAC system or greater than a maximum capacity of the HVAC system, wherein the target zone capacity values are determined to correspond to the requested zone capacity values scaled by respective ones of the zone size values, responsive to the total of the requested zone capacity values between the minimum capacity and the maximum capacity; and
operating the fan of the HVAC system to provide the conditioned air to the zones according to respective ones of the target zone capacity values.

12. The method of claim 11, wherein the HVAC equipment is set up in an installation with zone dampers controllable to regulate airflow of the conditioned air to respective ones of the zones, and causing the HVAC system to provide the conditioned air includes:
converting the target zone capacity values to target zone airflow values for the zones of the conditioned space; and
determining a damper position set from the target zone airflow values; and
wherein causing the HVAC system to provide the conditioned air further includes actuating the zone dampers to respective damper positions of the damper position set.

13. The method of claim 11, wherein the HVAC system has a system operating mode and zone operating modes each of which is selectable between modes including a heating mode and a cooling mode, and the method further comprises:
determining a heating mode error value and a cooling mode error value for those of the zones in respectively the heating mode and the cooling mode, based on the zone ambient temperature values and the zone temperature setpoints;
determining a switch mode error value from the heating mode error value and the cooling mode error value; and
switching or maintaining the system operating mode based on the switch mode error value and a switchover error limit.

14. The method of claim 13, wherein switching or maintaining the system operating mode is further configured to initiate a minimum off time before switching the system operating modes.

15. The method of claim 11, wherein the zone priority levels are received through a user interface, the zone priority levels being a numerical value applied through the user interface.

16. The method of claim 11, wherein the zone priority levels are received from a schedule of time intervals over which the zone priority levels for one or more of the zones are set, the schedule providing a zone with a higher priority during a first time interval when the zone is likely to be occupied and a lower priority during a second time interval when the zone is likely to be unoccupied.

17. The method of claim 16, wherein determining the requested zone capacity values includes determining the requested zone capacity values based on zone humidity values.

18. The method of claim 17, wherein the zone humidity values are zone dew point values; and
wherein determining the requested zone capacity values includes:
determining a weighted average relative humidity value from the zone ambient temperature values, the zone dew point values, and the zone priority levels;
determining a weighted average temperature setpoint from the zone ambient temperature values, the zone temperature setpoints, and the zone priority levels; and
wherein the requested zone capacity values are determined based on, in part, the weighted average relative humidity value and the weighted average temperature setpoint.

19. The method of claim 11, wherein determining the target zone capacity values includes scaling down the target zone capacity values based on the maximum capacity and the zone priority levels, responsive to the total of the requested zone capacity values that is greater than the maximum capacity, and
wherein scaling down the target zone capacity values includes:
determining redistributed zone capacity values based on the maximum capacity, the target zone capacity values, and zone cost values that represent loss of comfort and are a function of zone ambient temperature error values and the zone priority levels;
determining zone capacity excess or deficit values between respective ones of the target zone capacity values and the redistributed zone capacity values; and
redetermining the target zone capacity values based on respective ones of the redistributed zone capacity values and the zone capacity excess or deficit values.

20. The method of claim 11, wherein determining the target zone capacity values includes scaling up the target zone capacity values based on the minimum capacity and respective proportions of a total of the target zone capacity values, responsive to the total of the requested zone capacity values that is less than the minimum capacity, and
wherein determining the target zone capacity values further includes:
determining that one or more of the target zone capacity values as scaled up for one or more of the zones are greater than a respective maximum zone capacity, thereby indicating excess capacity for the one or more of the zones; and
redetermining the target zone capacity values to distribute the excess capacity for the one or more of the zones to one or more other of the zones, the target zone capacity values redetermined based on the target zone capacity values as scaled up, and the zone priority levels.

* * * * *